(12) United States Patent
Seo et al.

(10) Patent No.: US 10,153,539 B2
(45) Date of Patent: Dec. 11, 2018

(54) ANTENNA DEVICE AND ELECTRONIC DEVICE HAVING THE SAME

(71) Applicant: Samsung Electronics Co., Ltd., Gyeonggi-do (KR)

(72) Inventors: Jung-Hoon Seo, Gyeonggi-do (KR); Ui-Chul Jeong, Gyeonggi-do (KR); Se-Hyun Park, Gyeonggi-do (KR); Jae-Ho Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/056,419

(22) Filed: Feb. 29, 2016

(65) Prior Publication Data

US 2016/0254590 A1 Sep. 1, 2016

(30) Foreign Application Priority Data

Feb. 27, 2015 (KR) .................. 10-2015-0028663

(51) Int. Cl.
*H01Q 1/24* (2006.01)
*H01Q 1/48* (2006.01)
*H01Q 9/42* (2006.01)
*H01Q 5/00* (2015.01)
*H04B 1/00* (2006.01)
*H01Q 5/335* (2015.01)
*H01Q 5/364* (2015.01)

(52) U.S. Cl.
CPC .............. *H01Q 1/243* (2013.01); *H01Q 1/48* (2013.01); *H01Q 5/335* (2015.01); *H01Q 5/364* (2015.01); *H01Q 9/42* (2013.01); *H04B 1/006* (2013.01)

(58) Field of Classification Search
CPC ........ H01Q 5/357; H01Q 5/364; H01Q 5/371; H01Q 5/378; H01Q 5/385; H01Q 5/392
See application file for complete search history.

(56) References Cited

U.S. PATENT DOCUMENTS

| 8,330,657 | B2* | 12/2012 | Liu | H01Q 9/145 343/700 MS |
|---|---|---|---|---|
| 2003/0122721 | A1* | 7/2003 | Sievenpiper | H01Q 9/14 343/767 |
| 2006/0097918 | A1* | 5/2006 | Oshiyama | H01Q 1/243 343/700 MS |
| 2008/0231532 | A1 | 9/2008 | Rao et al. | |
| 2008/0266199 | A1 | 10/2008 | Milosavljevic et al. | |

(Continued)

FOREIGN PATENT DOCUMENTS

EP 2 498 337 9/2012

OTHER PUBLICATIONS

International Search Report dated May 26, 2016 issued in counterpart application No. PCT/KR2016/001705, 10 pages.

(Continued)

*Primary Examiner* — Daniel J Munoz
(74) *Attorney, Agent, or Firm* — The Farrell Law Firm, P.C.

(57) ABSTRACT

Disclosed are an antenna device and an electronic device that includes the antenna device. The antenna device includes a power feeding unit, a ground unit, a radiating unit that is electrically connected to the power feeding unit, and a switching element that selects one or more points from a plurality of different points of the ground unit and connects the radiating unit to the selected one or more points.

18 Claims, 17 Drawing Sheets

(56) References Cited

U.S. PATENT DOCUMENTS

| | | |
|---|---|---|
| 2009/0285262 A1 | 11/2009 | Kim |
| 2010/0231461 A1 | 9/2010 | Tran |
| 2011/0102290 A1 | 5/2011 | Milosavljevic |
| 2012/0299785 A1* | 11/2012 | Bevelacqua ............ H01Q 9/42 343/702 |
| 2013/0234901 A1* | 9/2013 | Chang ................... H01Q 1/243 343/746 |
| 2013/0234903 A1 | 9/2013 | Kwak et al. |
| 2014/0128007 A1 | 5/2014 | Chen et al. |
| 2014/0145892 A1* | 5/2014 | Tseng ................... H01Q 5/321 343/750 |
| 2014/0273832 A1 | 9/2014 | Kim |
| 2015/0022422 A1 | 1/2015 | Chang et al. |
| 2015/0054701 A1* | 2/2015 | Kim ................... H01Q 9/0442 343/750 |

OTHER PUBLICATIONS

European Search Report dated Jul. 4, 2016 issued in counterpart application No. 16157871.1-1811, 11 pages.

* cited by examiner

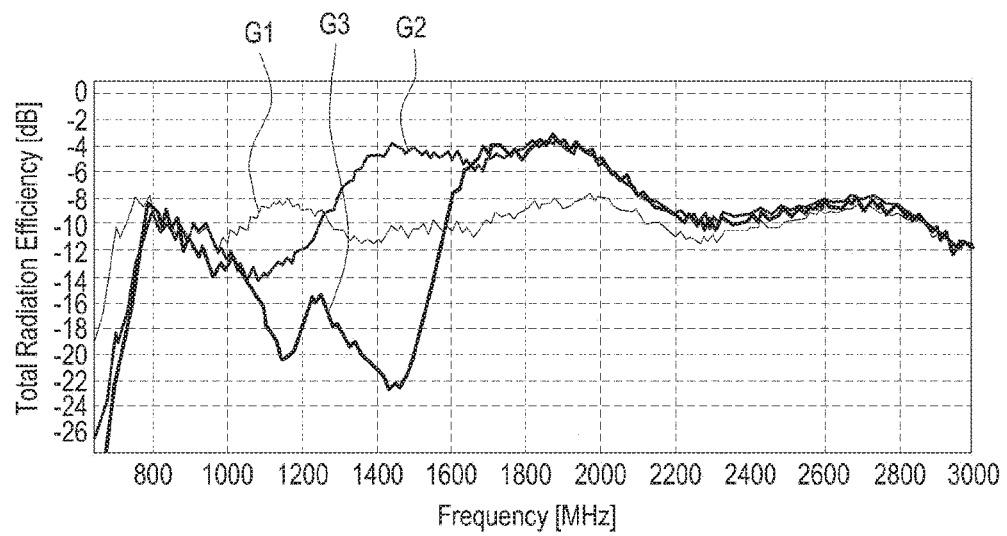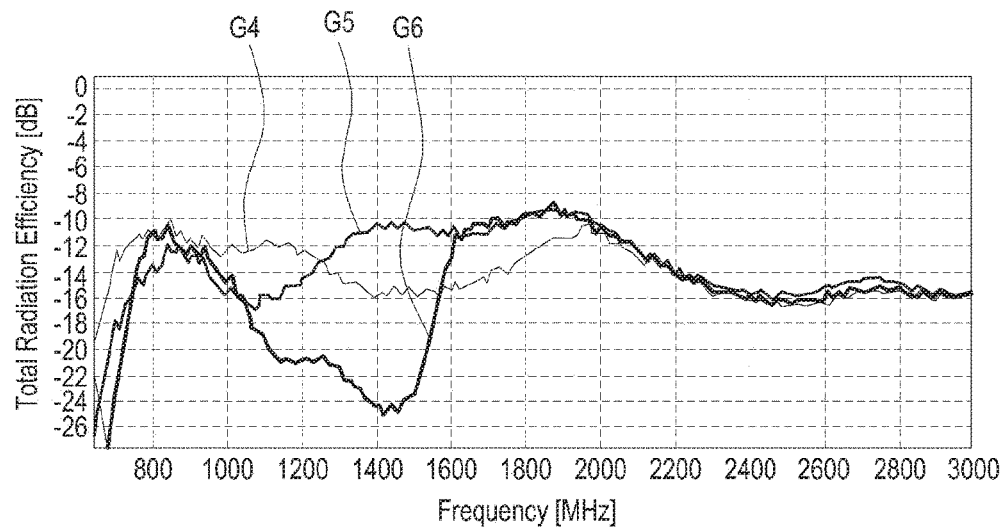
FIG.17

ANTENNA DEVICE AND ELECTRONIC DEVICE HAVING THE SAME

PRIORITY

This application claims priority under 35 U.S.C. § 119(a) to Korean Patent Application Serial no. 10-2015-0028663, which was filed in the Korean Intellectual Property Office on Feb. 27, 2015, the contents of which are incorporated herein by reference.

BACKGROUND OF THE DISCLOSURE

1. Field of the Disclosure

The present disclosure relates generally to an electronic device, and more particularly, to an electronic device that is provided with an antenna.

2. Description of the Related Art

An electronic device performs a specific function according to an installed program, such as an electronic scheduler, a portable multimedia reproducer, a mobile communication terminal, a tablet personal computer (PC), an image/sound device, a desktop/laptop PC, a vehicular navigation system, or a home appliance. Such an electronic device may output information stored therein as sound or an image.

As the integration degree of such an electronic device has increased, and super-high speed and large capacity wireless communication has been popularized, various functions have recently been installed in a single mobile communication terminal. In addition to a communication function, a game, multimedia, communication and security for mobile banking, schedule management, and e-wallet function are now integrated in a single electronic device.

An antenna device is required in order to enable wireless communication. The antenna device is installed a sufficient distance away from other circuit devices in order to prevent the antenna device from interfering with the other circuit devices in the process of transmitting/receiving a high frequency signal. An electronic device, which performs super-high speed and large capacity wireless communication and complies with the standards of fourth generation (4G) mobile communication systems, such as long term evolution (LTE) communication standards, is connected to a commercial communication network through various frequency bands. For the purpose of connecting various frequency bands in a single electronic device, the antenna device is provided with a plurality of radiators, of which the number corresponds to the number of the frequency bands.

It is difficult to install an antenna device in the conventional art when the thickness of the electronic device is reduced for portability while providing a larger-type display device. For example, it is necessary to reduce the thickness of the electronic device in order to secure the portability of the electronic device. However, there is a limit in the number of radiators that can be implemented to cope with various wireless communication frequency bands while securing a sufficient distance for preventing the radiators from interfering with other circuit devices.

As such, there is a need in the art for a simply-constructed antenna device that is capable of coping with various frequency bands while preventing interference with other devices.

SUMMARY

The present disclosure has been made to address the above-mentioned problems and disadvantages, and to provide at least the advantages described below.

Accordingly, an aspect of the present disclosure is to provide an antenna device that may be easily miniaturized while coping with various frequency bands, and an electronic device that is provided with the antenna device.

According to an aspect of the present disclosure, an antenna device includes a power feeding unit, a ground unit, a radiating unit that is electrically connected to the power feeding unit, and a switching element that selects one or more points from a plurality of different points on the ground unit and connects the radiating unit to the selected one or more points.

According to another aspect of the present disclosure, an electronic device includes a processor and an antenna device. The antenna device includes a processor and an antenna device, wherein the antenna device includes a power feeding unit, a ground unit, a radiating unit that is electrically connected to the power feeding unit, and a switching element that selects one or more points from a plurality of different points on the ground unit and connects a point of the radiating unit to the selected one or more points of the ground unit, and wherein the processor adjusts a resonance frequency of the antenna device by operating the switching element.

According to another aspect of the present disclosure, a portable electronic device includes an external housing including a first face, a second face that is opposite to the first face, and a side wall that encloses a space between the first face and the second face, the side wall including a first portion that includes metal, a printed circuit board that forms a face, which is substantially parallel to the first face, within the external housing, and includes a first region having a ground and a second region having an insulating material, a switching element that includes a first terminal, a second terminal, and a third terminal, a communication module that is included within the external housing, a first electric path that interconnects the communication module and a first position of the first portion, a second electric path that is connected to the first terminal of the switching element, and is connected to the first electric path in the second region, a third electric path that is connected to the second terminal of the switching element and a first point of the ground, and a fourth electric path that is connected to the third terminal of the switching element and a second point of the ground, different than the first point.

BRIEF DESCRIPTION OF THE DRAWINGS

The above and other aspects, features, and advantages of the present disclosure will be more apparent from the following detailed description taken in conjunction with the accompanying drawings, in which:

FIGS. 16 and 17 are graphs representing radiating characteristics of the antenna device according to the fifth embodiment of the present disclosure;

DETAILED DESCRIPTION OF EMBODIMENTS OF THE DISCLOSURE

Figure 1:
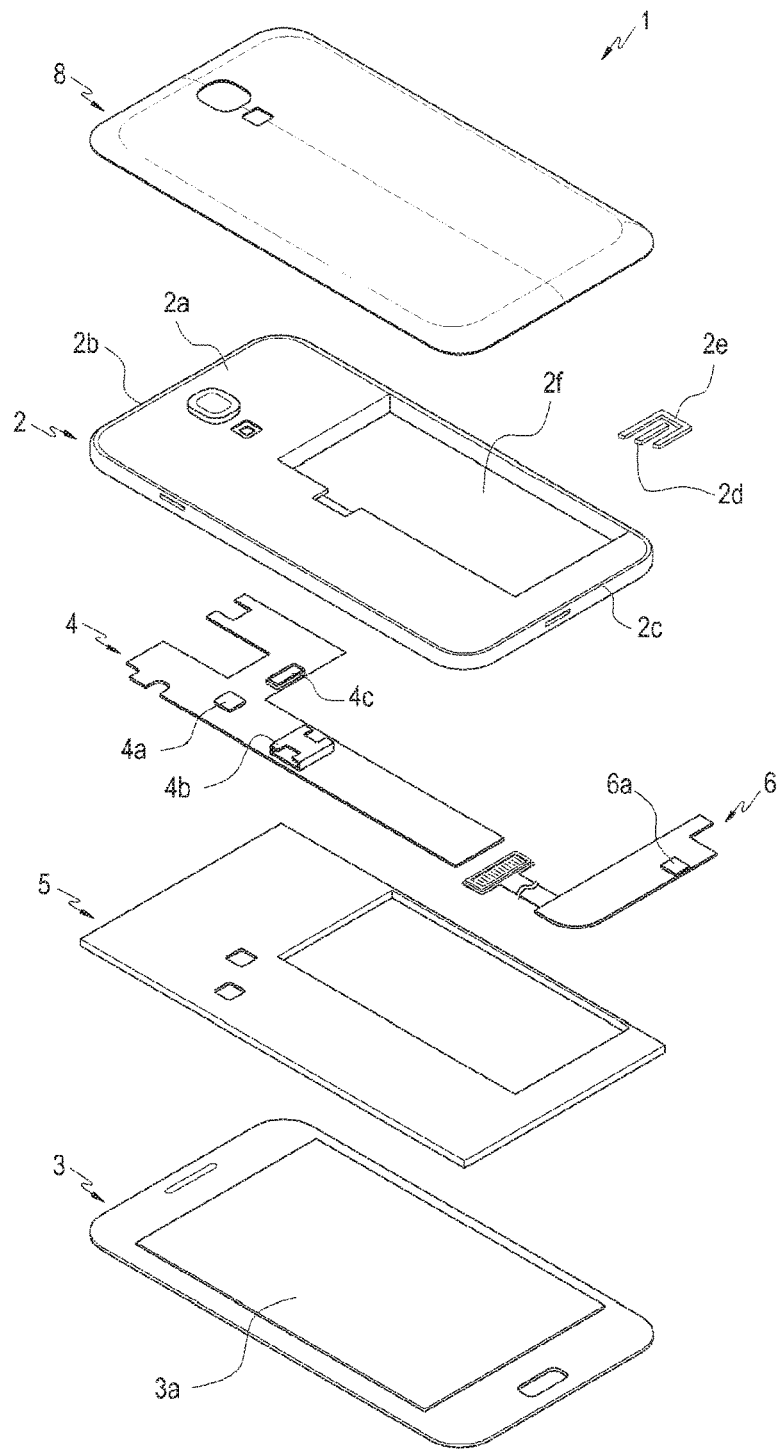
FIG. 1 is an exploded perspective view illustrating an electronic device according to embodiments of the present disclosure.

Hereinafter, embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. Descriptions of well known functions and/or configurations will be omitted for the sake of clarity and conciseness.

As used herein, the expressions "have", "may have", "include", or "may include" refer to the existence of a corresponding feature, such as a numeral, function, operation, or constituent element, and do not exclude one or more additional features.

In the present disclosure, the expressions "A or B", "at least one of A or/and B", or "one or more of A or/and B" include all possible combinations of the items listed. For example, the expressions "A or B", "at least one of A and B", or "at least one of A or B" refer to all of (1) including A, (2) including B, and (3) including all of A and B.

The expressions "a first", "a second", "the first", or "the second" used in embodiments of the present disclosure may modify various components regardless of the order and/or the importance but does not limit the corresponding components. For example, a first user device and a second user device indicate different user devices although both are user devices. A first element may be referred to as a second element, and similarly, a second element may be referred to as a first element without departing from the scope of the present disclosure.

It should be understood that when an element, such as a first element, is referred to as being operatively or communicatively "connected," or "coupled," to another element, such as a second element, it may be directly connected or coupled to the second element or any other element, such as a third element, may be interposed between the first and second elements. In contrast, it may be understood that when a first element is referred to as being "directly connected," or "directly coupled" to a second element, there is no third element interposed between the first and second elements.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may indicate that the device, together with other devices or components, "is able to". For example, the phrase "processor adapted (or configured) to perform A, B, and C" may indicate a dedicated or embedded processor only for performing the corresponding operations or a generic-purpose processor, such as central processing unit (CPU) or application processor (AP) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise.

Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even the terms defined in the present disclosure should not be interpreted to exclude embodiments of the present disclosure.

In the present disclosure, an electronic device may be a random device, and may be referred to as a terminal, a portable terminal, a mobile terminal, a communication terminal, a portable communication terminal, a portable mobile terminal, or a display device, for example.

An electronic device according to embodiments of the present disclosure includes at least one of a smart phone, a tablet PC, a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device includes at least one of an accessory type, such as a watch, a ring, a bracelet, an anklet, a necklace, a glasses, a contact lens, or a head-mounted device (HMD), a fabric or clothing integrated type, such as an electronic clothing, a body-mounted type, such as a skin pad, or tattoo, and a bio-implantable type, such as an implantable circuit.

According to some embodiments, the electronic device may be a home appliance such as a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box, such as Samsung HomeSync™, Apple TV™, or Google TV™, a game console, such as Xbox™ and PlayStation™, an electronic dictionary, an electronic key, a camcorder, and an electronic photo frame.

According to another embodiment, the electronic device includes at least one of various medical devices, such as a blood glucose monitoring, heart rate monitoring, blood pressure measuring, and a body temperature measuring device, a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic device for a ship, such as a ship navigation device and a gyro-compass, avionics, security devices, an automotive head unit, a robot for home or industry, an automatic teller machine (ATM), point of sales (POS) device in a shop, or an Internet of Things (IoT) device, such as a light bulb, various sensors, electric or gas meter, sprinkler device, fire alarm, thermostat, streetlamp, toaster, sporting goods, hot water tank, heater, or boiler.

According to some embodiments, the electronic device includes at least one of a part of furniture or a building/structure, an electronic board, an electronic signature receiving device, a projector, and various types of measuring instruments, such as a water meter, an electric meter, a gas meter, and a radio wave meter. In various embodiments, the electronic device may be a combination of one or more of the aforementioned various devices, and may be a flexible device. The electronic device according to an embodiment of the present disclosure is not limited to the aforementioned devices, and may include a new electronic device according to the development of new technologies.

As used herein, the term "user" indicates a person who uses an electronic device or an artificial intelligence electronic device that uses an electronic device.

The electronic device may be a smartphone, a portable phone, a game player, a television (TV), a display unit, a heads-up display unit for a vehicle, a notebook computer, a laptop computer, a tablet personal computer (PC), a personal media player (PMP), or a personal digital assistant (PDA), for example. The electronic device may be implemented as a portable communication terminal which has a wireless communication function and a pocket size, and may be a flexible device or a flexible display device.

The electronic device communicates with an external electronic device, such as a server, or performs an operation through an interworking with the external electronic device. For example, the electronic device transmits an image photographed by a camera and/or position information detected by a sensor unit to the server through a network. The network may be a mobile or cellular communication network, a local area network (LAN), a wireless local area network (WLAN), a wide area network (WAN), the Internet, or a small area network (SAN) but is not limited thereto.

It is noted that the terms "low frequency band" and "high frequency band" may be used in describing specific embodiments of the present disclosure in order to differentiate a plurality of different resonance frequencies, which are formed by an antenna device according to any one of embodiments of the present disclosure, relative to each other. For example, even if a resonance frequency of 1.8 GHz is defined as a high frequency band in one embodiment, it may be a low frequency in another embodiment. When an antenna device of one embodiment forms a resonance frequency in each of two different frequency bands, the relatively high frequency may be defined as a "high frequency band" and the relatively low frequency may be defined as a "low frequency band."

Specific frequency values for the "low frequency band" and the "high frequency band" may be represented in describing a specific embodiment of the present disclosure. However, this is merely to assist in the understanding of embodiments of the present disclosure, and the present disclosure is not limited thereto. For example, the respective frequency values of resonance frequency bands that are formed by antenna devices may be properly changed, depending on the use environment of an electronic device or the frequency band that is allocated to a service provider.

In describing the various embodiments of the antenna device illustrated in the drawings, the components that can be easily understood through the configuration of the preceding embodiment, will be denoted by the same reference numerals or the reference numerals will be omitted, and the detailed descriptions thereof will also be omitted, for conciseness.

FIG. 1 is an exploded perspective view illustrating an electronic device according to embodiments of the present disclosure.

Referring to FIG. 1, an electronic device 1 includes a case member 2a, a frame 2b that is arranged around one face of the case member 2a to form a side wall, and an antenna device that uses at least a portion of a case 2, which is formed of the case member 2a and the frame 2b, as a radiating conductor.

The case 2 has a front-opened shape, in which the case member 2a forms the rear face of the case 2, and the frame 2b forms a side wall so that a front-opened accommodation space is formed. The case 2 is at least partially made of a metal material. The other portion is made of a synthetic resin. For example, the case member 2a may include a synthetic resin, and a portion or all of the frame 2b may include a metal material. When the case 2 is made of a combination of the metal material and the synthetic resin, the case 2 is molded by insert injection molding. For example, when the case member 2a is molded by introducing a molten resin into a mold when the frame 2b, which is formed of a metal material, is seated in the mold, the frame 2b is joined to the case member 2a simultaneously with the molding of the case member 2a, thereby forming the case 2. The metal material portion of the frame 2b may form a portion of the antenna device of the electronic device 1.

The electronic device 1 further includes a front cover 3 that is mounted on the front face of the case 2. The front cover 3 may be formed of a window member, to which a display device 3a is coupled. According to various embodiments, a touch panel is incorporated into the front cover 3 and thereby provides a touch function of an input device.

The electronic device 1 includes one or more of circuit boards 4 and 6 that are accommodated in the case 2. The case 2 accommodates the circuit boards 4 and 6, on which electronic components, such as an integrated circuit chip 4a of an AP, a communication module, a memory, an audio module, and a power management module, a storage medium socket 4b, various sensors and connectors 4c, or an antenna device or an external device connecting connector 6a are mounted.

Various electronic components recited above may be distributed and arranged on the first and second circuit boards 4 and 6, respectively. For example, the integrated circuit chip 4a may be arranged on the first circuit board 4, and a portion of the antenna device or the external device connecting connector 6a may be arranged on the second circuit board 6. The integrated circuit chip 4a includes at least one of the AP, the communication module, and the audio module.

Each of the first and second circuit boards 4 and 6 may be fabricated to be suitable for the shape of the space that is provided by the case 2. For example, the case 2 provides a mounting recess 2f for accommodating a battery, and the first and second circuit boards 4 and 6 may be fabricated in a shape that is suitable to be arranged around the mounting recess 2f within the case 2.

The electronic device 1 further includes a support member 5 that is accommodated in the case 2. The support member 5 enhances the mechanical rigidity of the electronic device 1, and protects and isolates the various electronic components inside the electronic device 1 in relation to each other. For example, various electronic components, such as the integrated circuit chip 4a, are mounted on the first and second circuit boards 4 and 6. When the electronic components directly face and come in contact with the front cover 3, the front cover 3 may be damaged. The support member 5 is arranged between the first and second circuit boards 4 and 6 and the front cover 3, prevents the electronic components from coming into direct contact with the front cover 3, and shields electromagnetic waves that are generated by the above-mentioned electronic components while the electronic components are operated, thereby blocking the electromagnetic waves from influencing the operation of the other electronic components.

For example, as the support member 5 is arranged, the front cover 3 conducts a stable operation without being influenced by the electromagnetic waves that are generated by the other electronic components. The support member 5 provides various structures, on which the first and second circuit boards 4 and 6 may be fixedly mounted, and supports the front cover 3 and thereby stably maintains the flat shape of the front cover 3.

The electronic device 1 includes a rear cover member 8 that is provided to be attachable to/detachable from the rear face of the case 2. When the cover member 8 is separated, the mounting recess 2f is opened so that a user may exchange and use a battery. Among the above-mentioned electronic components the storage medium socket 2b is exposed to the rear face of the case 2. The cover member 8 is mounted on the rear face of the case 2 and thereby isolates and protects the mounting recess 2f or the storage medium socket 4b from the external environment.

Figure 2:
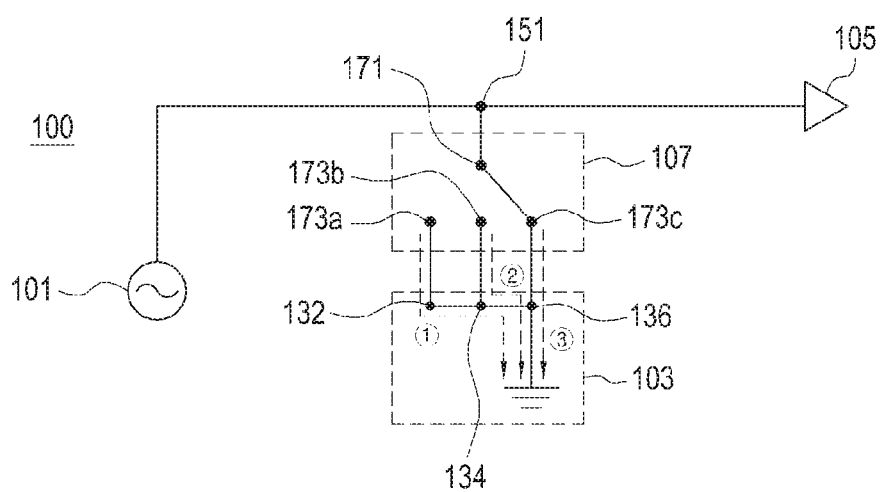
FIG. 2 is a block diagram illustrating an antenna device according to a first embodiment of the present disclosure.
Figure 3:
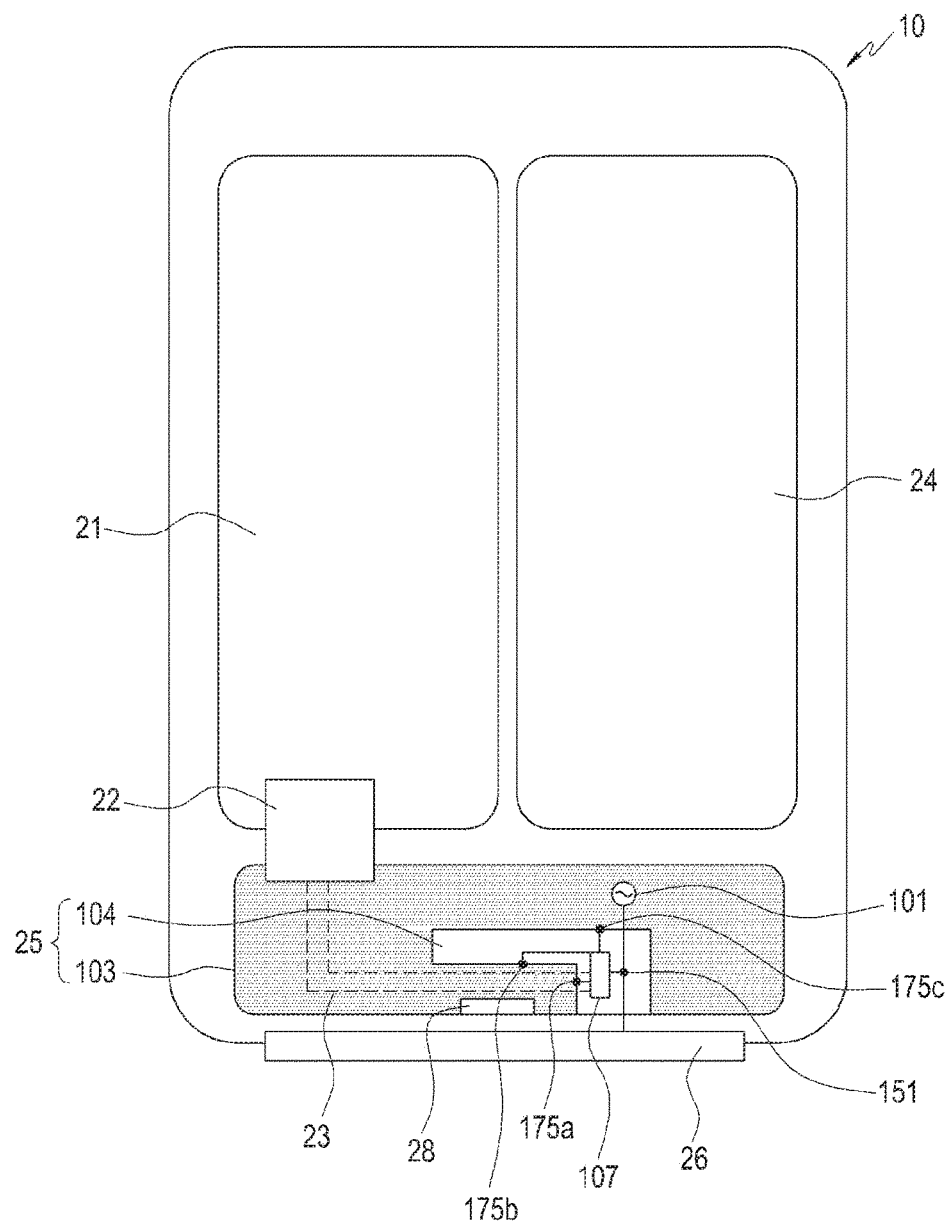
FIG. 3 illustrates an internal construct of an electronic device that includes the antenna device illustrated in FIG. 2.
Figure 4:
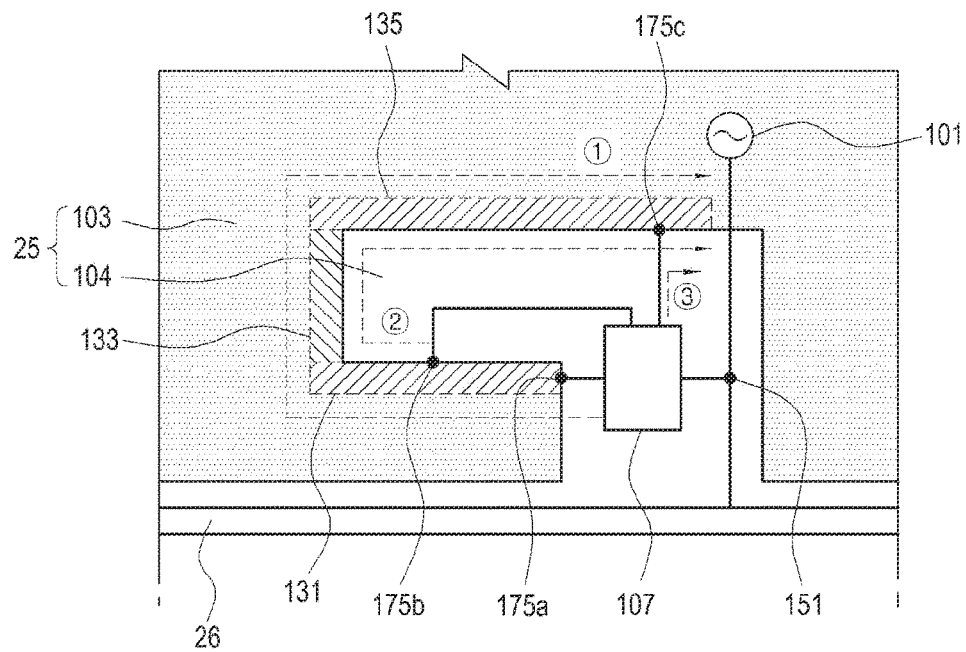
FIG. 4 illustrates a state in which the ground unit and the switching element of the antenna device illustrated in FIG. 3 are connected to each other.

FIG. 2 is an exploded perspective view illustrating an antenna device of an electronic device 100, according to a first embodiment of the present disclosure. FIG. 3 is a cross-sectional view illustrating a configuration of a portion of the antenna device of the electronic device 100 according to the first embodiment of the present disclosure. FIG. 4 is a cross-sectional view illustrating a configuration of another portion of the antenna device of the electronic device 100 according to the first embodiment of the present disclosure.

The antenna device of the electronic device 100 is connected to a communication module, which is provided in the form of an integrated circuit chip among the above-mentioned electronic components, or is provided in the form of a combination of integrated circuit chips, and thereby provides a wireless transmission/reception function. The antenna device uses, as a radiating conductor, a portion of a metal material, such as a portion of the frame 101b, which is exposed to the outside of the electronic device 100.

FIG. 2 is a block diagram illustrating an antenna device according to the first embodiment of the present disclosure.

Referring to FIG. 2, the antenna device 100 includes a power feeding unit 101, a ground unit 103, a radiating unit 105, and a switching element 107.

The power feeding unit 101 is electrically connected to the radiating unit 105 and applies a signal current to the radiating unit 105 so as to supply a high frequency signal, or receives another high frequency signal through the radiating unit 105.

The radiating unit 105 is implemented in various forms such as a rod, a meander line, a patch, or a microstrip, and is connected to be electrically connected to the power feeding unit 101, to transmit/receive a high frequency signal in at least one frequency band.

The switching element 107 selects any one point among a plurality of different points 132, 134, and 136 of the ground unit 103, and connects the radiating unit 105 to the selected point. The switching element 107 includes a first terminal 171 that is connected to one junction 151 between the power feeding unit 101 and the radiating unit 105, and a plurality of second terminals 173a, 173b, and 173c that are arranged to correspond to different points 132, 134, and 136 on the ground unit 103, respectively. For example, the second terminals 173a, 173b, and 173c may be electrically connected to the points 132, 134, and 136, respectively. As the switching element 107 is operated, the second terminal 173a, 173b, or 173c, which is connected to the first terminal 171, may be changed, and the electric length of the radiating unit 105 may be set depending on the position of the second terminal 173a, 173b, or 173c, which is connected to the first terminal 171, such as a corresponding one of different points 132, 134, and 136 on the ground unit 103.

Depending on the position of the second terminal 173a, 173b, or 173c that is connected to the first terminal 171, the electric length of the radiating unit 105 may be changed. For example, when the switching element 107 connects second terminal 173a to the first terminal 171, the electric length of the radiating unit 105 is proportional to the length of a first route ① that is set from the second terminal that is indicated by reference numeral "173a." When the switching element 107 connects second terminal 173b to the first terminal 171, the electric length of the radiating unit 105 is proportional to the length of a second route ② that is set from the second terminal that is indicated by reference numeral "173b." When the switching element 107 connects second terminal 173c to the first terminal 171, the electric length of the radiating unit 105 is proportional to the length of a third route ③ that is set from the second terminal that is indicated by reference numeral "173c."

The electric length of the radiating unit 105 corresponds to an impedance value according to the first, second, or third route a ①, ②, or ③, such as a resistance R, an inductive reactance L, or a capacitive reactance C, and may be changed depending on the forms of the first, second, and third routes ①, ②, or ③, or the form of the ground unit 103. In this manner, the electric length of the radiating unit 105 in the antenna device 100 may be changed by selecting any one point among the plurality of different points 132, 134, and 136 of the ground unit 103, and connecting the radiating unit 105 to the selected point. The resonance frequency band of the antenna device can be adjusted depending on the position of the second terminal 173a, 173b, or 173c where the switching element 107 is connected to the first terminal 171.

FIG. 3 illustrates an internal construct of an electronic device that includes the antenna device illustrated in FIG. 2. FIG. 4 illustrates a state in which the ground unit and the switching element of the antenna device illustrated in FIG. 3 are connected to each other.

The shape or structure of the antenna device illustrated in FIGS. 3 and 4 exemplifies the configuration illustrated in FIG. 2, and may be variously changed depending on the shape of an installation space in which the electronic device 10 is allowed, or a resonance frequency band that is required by the electronic device 10.

Referring to FIGS. 2, 3 and 4, the electronic device 10, which includes the antenna device, includes circuit boards 21 and 25, and a battery 24 that is electrically connected to the circuit boards 21 and 25, thereby supplying power to the circuit boards 21 and 25.

The circuit boards include a first circuit board 21 and a second circuit board 25 that is electrically connected to the first circuit board 21. The first circuit board 21 may be provided as a main circuit board. For example, a drive circuit of a display module of the electronic device 10, a communication circuit and various connectors of the electronic device 10, which provide an interface with a user, a connection to another electronic device or a commercial communication network, and a sensor module of the electronic device 10 are mounted on the main circuit board. The second circuit board 25 is connected to the first circuit board 21 through a connector 22, and is constituted with a portion of the first circuit board 21. The second circuit board 25 is provided with a connecting member 28, which provides an electric connecting means between the electronic device 10 and an external device, such as a charger.

The second circuit board 25 includes a conductive region 103, which provides the ground unit, and a non-conductive region 104. For example, the conductive region 103 of the second circuit board 25 may be used as the ground unit 103. In the following detailed description, therefore, the ground unit and the conductive region are denoted by the same reference numeral "103." The ground unit 103 includes a first ground portion 131, a second ground portion 133 that extends from the first ground portion 131, and a third ground portion 135 that extends from the second ground portion 133 and is arranged to be adjacent to the first ground portion 131.

For example, the first ground portion 131 extends vertically from one end of the second ground portion 133, and the third ground portion 135 extends vertically from the other end of the second ground portion 133 to be parallel to the first ground portion 131. The non-conductive region 104 is made of a material that does prevents the flow of current, and is formed among the first to third ground portions 131, 133, and 135. The conductive region 103 is formed on the second circuit board 25, and the non-conductive region 104 in the form of a slot is formed by removing a portion of the conductive region 103, so that the ground unit 103 has generally a square or rectangular "⊏" shape. However, the shape of the ground unit 103 is not limited to the "⊏" shape, and may have various shapes, such as a "C" shape or an "L" shape, such that the conductive region 103 encloses two or more sides of the non-conductive region 104.

A radiating portion 26 of the case of the electronic device 10 is included in the radiating unit 105, is made of a conductive material, and is electrically connected to the power feeding unit 101.

The switching element 107 is provided in the non-conductive region 104 of the second circuit board 25 in FIG. 4. However, the switching element 107 may instead be provided in the conductive region 103 of the second circuit board 25. The switching element 107 may be configured such that the first terminal 171 is connected to one junction 151 between the power feeding unit 101 and the radiating portion 26 of the case, and may be formed as a switch that includes one input route and three or more output routes.

For example, the switching element 107 may be a single pole 3 throw (SP3T) switch that has one input route and three output routes, a single pole double throw (SPDT) switch that has one input route and two output routes, or a single pole quad throw (SPQT) switch that has one input route and four output routes. Such switching elements may be implemented as a switch that uses a semiconductor element, or as a micro electro mechanical system (MEMS) or a tunable element, such as a capacitance variable element.

The second terminals of the switching element 107 are arranged at a first point 175a that is positioned at one end of the first ground portion 131, a second point 175b that is positioned in a portion of the first ground portion 131 other than the first point 175a, and a third point 175c that is positioned in a portion of the third ground portion 135 different than the first and second points 175a and 175b, respectively. However, the second terminals of the switching element 107 are not limited thereto, and the number and positions of the second terminals may be properly set depending on resonance frequency bands that are required by the electronic device and the number of the resonance frequency bands. The switching element 107 is electrically connected to the first circuit board 21 through a conducting line 23, such as a printed circuit pattern that is mounted in the second circuit board 25.

For example, the conducting line 23 provides a signal or power supply route for controlling the switching operation of the switching element 107. As the conducting line 23 is mounted within the second circuit board 25, such as on the ground unit 103, the conducting line 23 is prevented from electromagnetically interfering with the radiating portion 26 of the case that acts as the radiator 105 of FIG. 2. That is, since the second circuit board 25 acts as the ground unit 103 and the conducting line 23 is mounted within the second circuit board 25, the radiation efficiency of the radiator 105 is maintained and improved.

When the radiating unit 105 is electrically connected to the first point 175a as the switching element 107 is operated, the first route ①, which is formed along the first, second and third ground portions 131, 133, and 135 from the first point 175a, provides an electric ground to the radiating unit 105. In this instance, the radiating unit 105 is operated in the first resonance frequency band.

When the radiating unit 105 is connected to the ground unit 103 via the second point 175b, the second route ②, which is formed along the first, second, and third ground portions 131, 133, and 135 from the second point 175b, provides an electric ground to the radiating unit 105. In this instance, the radiating unit 105 is operated in the second resonance frequency band. When the radiating unit 105 is connected to the ground unit 103 via the third point 175*c*, the third route ③, which is formed along the third ground portion 135 from the third point 175*c*, provides an electric ground to the radiating unit 105. In this instance, the radiating unit 105 is operated in the third resonance frequency band.

As described above, according to embodiments of the present disclosure, the antenna device 100 selects any one point among the first to third points 175*a*, 175*b*, and 175*c* and connects the radiating unit 105 by using the switching element 107, so that any one of the first to third resonance frequency bands can be selected.

In configuring the ground unit 103, a wiring structure can be simplified according to the shapes of the first to third ground portions 131, 133, and 135 and the arrangement of the switching element 107. For example, since the first to third ground portions 131, 133, and 135 are arranged around the switching element 107, the wiring length for connecting the different points on the ground unit 103 to the switching element 107 as well as the installation space of the antenna device 100 are reduced.

Figure 5:
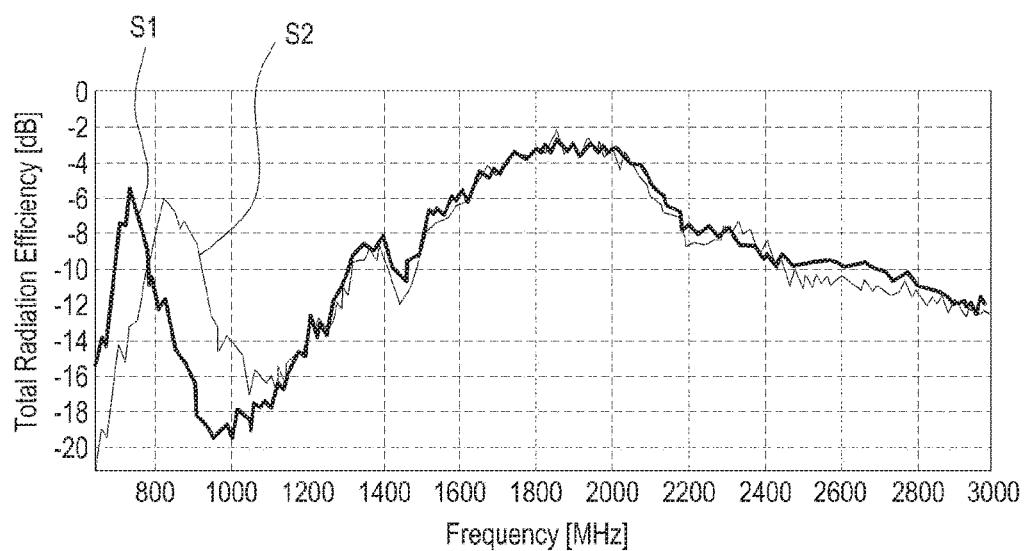
FIGS. 5 and 6 are graphs representing radiating characteristics of the antenna device according to the first embodiment of the present disclosure.
Figure 6:
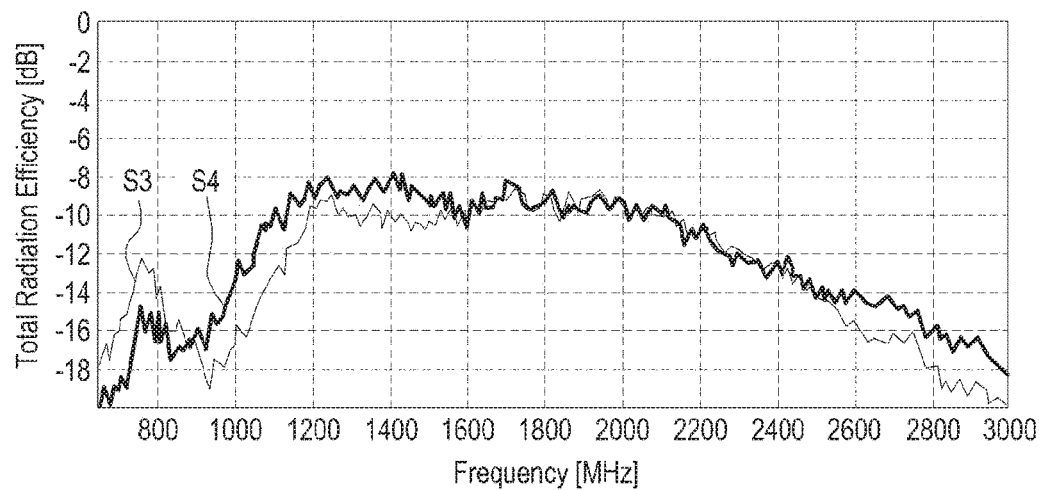

FIGS. 5 and 6 are graphs representing radiating characteristics of an antenna device according to the first embodiment of the present disclosure.

FIG. 5, which will be described in reference to FIGS. 2 and 3, represents a total radiation efficiency, measured in decibels (dB), of the antenna device 100 that was measured according to the operation of the switching element 107. the resonance frequency can be adjusted (shifted) by about 100 MHz from the frequency band of about 800 MHz by the operation of the switching element 107.

When the radiating unit 105 is electrically connected to the second point 175*b* by the operation of the switching element 107, the antenna device 100 can form resonance frequencies in 700 MHz and 1850 MHz bands, as indicated by S1 in FIG. 5. As described above, the radiating unit 105 may be configured to include at least one of the conductive elements of the electronic device, such as all or the radiating portion 26 of the case.

When the switching element 107 is operated so that the radiating unit, such as the radiating portion 26 of the case, is connected to the ground unit 103 through the first point 175*a*, the antenna device 100 forms resonance frequencies in 850 MHz and 1850 MHz bands, as indicated by S2 in FIG. 5.

In this manner, according to embodiments of the present disclosure, the antenna device 100 can secure resonance frequencies in different frequency bands, such as a low frequency band of about 800 MHz and a high frequency band of about 1850 MHz, and the resonance frequency of the low frequency band can be adjusted depending on the position where the radiating unit, at the radiating portion 26 of the case, is connected to the ground unit 103 through the switching element 107.

According to embodiments of the present disclosure, the antenna device 100 can stably maintain the resonance frequency of the high frequency band and the radiation efficiency, even if the low frequency band is changed. The resonance frequency of the antenna device 100 can be adjusted by adjusting the electric length of the radiating portion 26 by changing the first and second points 175*a* and 175*b* where the radiating portion 26 is connected to the ground unit 103, even if the resonance frequency is not adjusted by adjusting the electric length of the radiating portion 26.

FIG. 6 is a graph representing the total radiation efficiency of the electronic device when the user of the electronic device grips the electronic device, such as by hand.

First, referring to FIG. 5, before a degradation of the radiation efficiency is caused due to the influence of the user's body, such as a hand, the antenna device may have a radiation efficiency of about −6 dB in the band of about 800 MHz.

Referring to FIG. 6, as described above with reference to FIG. 5 or the like, when the antenna device, which is configured by feeding power into a PCB, forms a resonance frequency in the band of about 800 MHz, the total radiation efficiency of −10 dB or more is obtained. When the user's body comes close to the radiating unit of the antenna device, such as when the user grips the side face metal of the electronic device by a hand, the total radiation efficiency may be degraded to about −15 dB, as indicated by S4 in FIG. 6. On the contrary, according to embodiments of the present disclosure, since the antenna is not configured by feeding power into a PCB, the total radiation efficiency of about −12 dB is obtained, as indicated by S3 in FIG. 6, in the band of about 800 MHz when influenced by the user's body. For example, when there is interference by the user's body, the antenna device according to embodiments of the present disclosure can improve the radiation efficiency by about 3 dB, compared to the antenna device that is configured by feeding power into a PCB.

Figure 7:
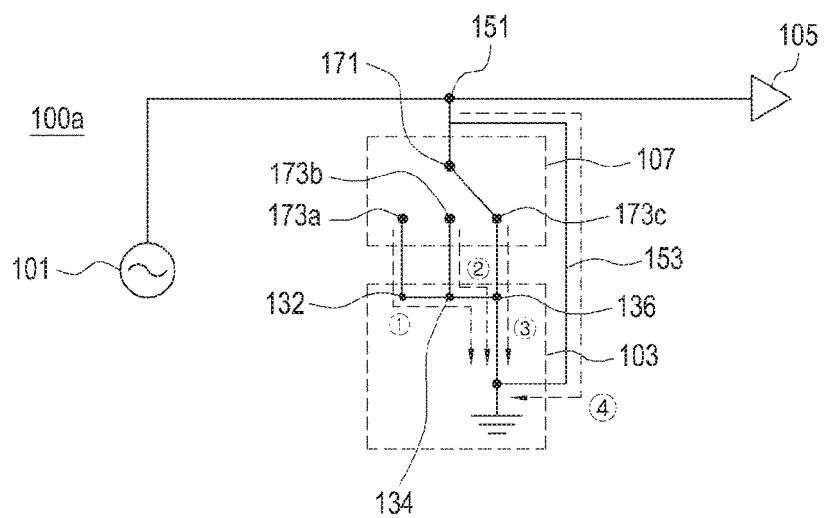
FIG. 7 is a block diagram illustrating an antenna device according to a second embodiment of the present disclosure.

FIG. 7 is a block diagram illustrating an antenna device according to a second embodiment of the present disclosure.

Referring to FIG. 7, the antenna device 100*a* further includes a ground line 153 that is branched between the junction 151 and the switching element 107 and is connected to the ground unit 103. The ground line 153 bypasses the switching element 107 and connects the radiating unit 105 to the ground unit 103, without passing through the switching element 107. For example, when the first terminal 171 of the switching element 107 is not connected to one of the second terminals 173*a*, 173*b*, and 173*c*, the radiating unit 105 is electrically connected to the ground unit 103 along the ground line 153. Therefore, the electric length of the radiating unit 105 is proportional to the length of a fourth route ④ that is set by the ground line 153.

Figure 8:
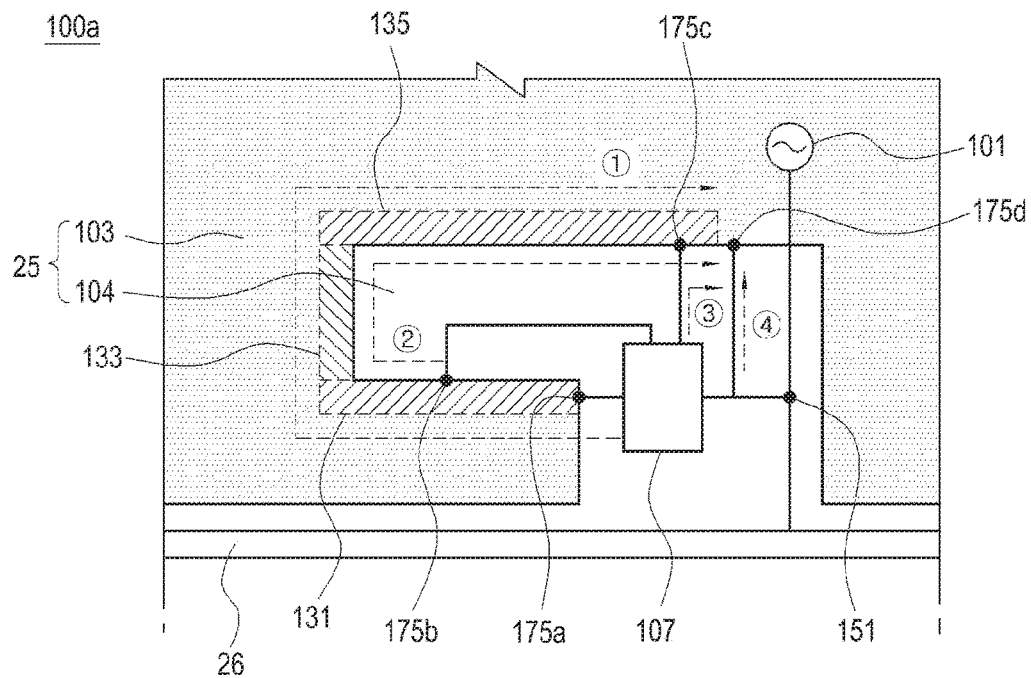
FIG. 8 illustrates a state in which the ground unit and the switching element of the antenna device illustrated in FIG. 7 are connected to each other.
Figure 9:
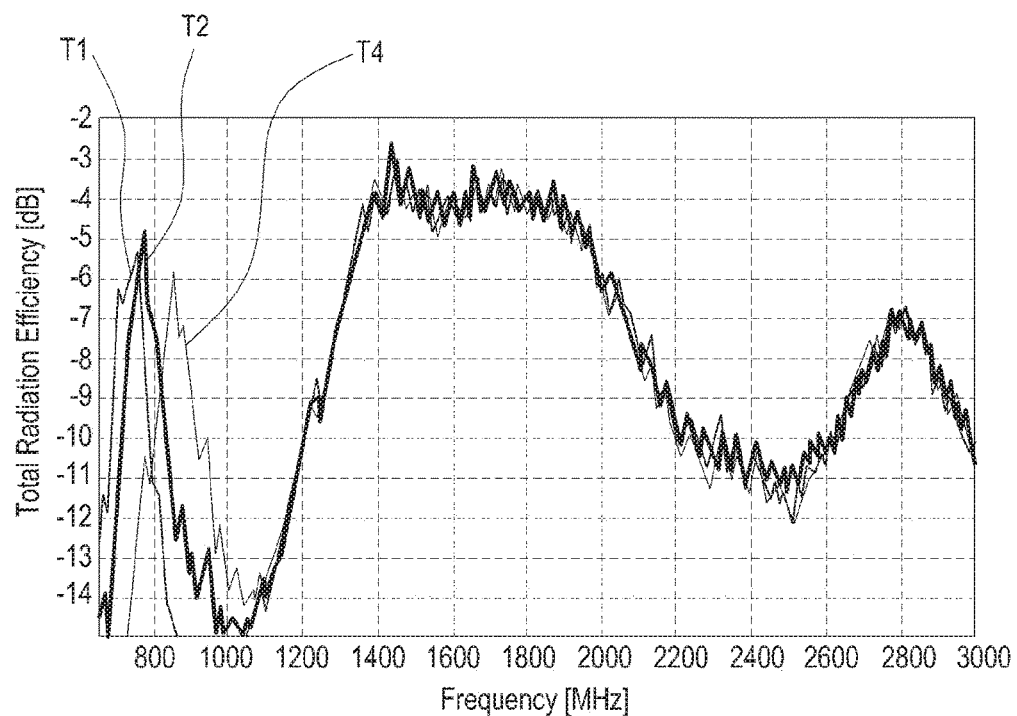
FIGS. 9 and 10 are graphs representing radiating characteristics of the antenna device according to the second embodiment of the present disclosure.
Figure 10:
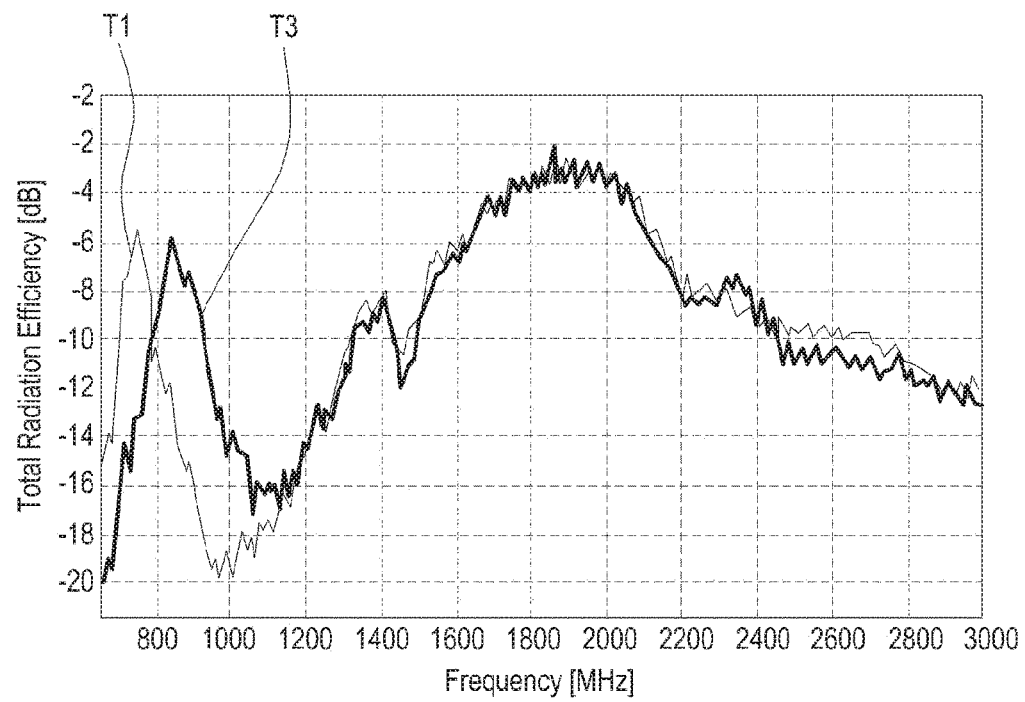

FIG. 8 illustrates a state in which the ground unit and the switching element of the antenna device illustrated in FIG. 7 are connected to each other. FIGS. 9 and 10 are graphs representing radiating characteristics of the antenna device according to the second embodiment of the present disclosure.

Referring to FIGS. 6, 7 and 8, the ground line 153 is branched between the junction 151 and the switching element 107, and is connected to a portion 175*d* of the ground unit 103.

The switching element 107 cuts off the electric connection to the ground unit 103 such that the radiating unit 105 does not pass through the first to third routes ①, ②, or ③. At this time, the radiating unit 105 is provided with a ground that is set by the fourth route ④ that is formed along the ground line 153 to form a resonance frequency in the 700 MHz band, as indicated by T1 in FIG. 9.

Upon being electrically connected to the first point 175*a* as the switching element 107 is operated, the radiating unit 105 is simultaneously provided with the ground set by the fourth route ④ that is formed along the ground line 153, together with the ground set by the first route ① that is formed along the first to third ground portions 131, 133, and 135 from the first point 175*a*. As illustrated in FIG. 9, since the radiating unit 105 is simultaneously provided with the grounds that are set by the first route ①  and the fourth route ④ , the antenna device 100a forms a resonance frequency in the 900 MHz band, as indicated by T4 in FIG. 9, and secures a radiation efficiency of about −10 dB or more such that the antenna device 100a can perform a stable wireless transmission/reception function.

Upon being electrically connected to the second point 175b as the switching element 107 is operated, the radiating unit 105 is simultaneously provided with the ground set by the fourth route ④  that is formed along the ground line 153, together with the ground set by the second route ② that is formed along the first to third ground portions 131, 133, and 135 from the second point 175b. As illustrated in the graph of FIG. 10, since the radiating unit 105 is simultaneously provided with the grounds that are set by the second route ② and the fourth route ④ , the antenna device 100a forms a resonance frequency in the 850 MHz band, as indicated by T3, and secures a radiation efficiency of about −10 dB or more such that the antenna device 100a can perform a stable wireless transmission/reception function.

Upon being electrically connected to the third point 175c as the switching element 107 is operated, the radiating unit 105 is simultaneously provided with the ground set by the fourth route ④  that is formed along the ground line 153, together with the ground that is set by the third route ③ that is formed along the third ground portion 135 from the third point 175c. As illustrated in FIG. 9, since the radiating unit 105 is simultaneously provided with the grounds that are set by the third route ③ and the fourth route ④ , the antenna device 100a forms a resonance frequency in the 750 MHz band, as indicated by T2 in FIG. 9, and forms a resonance frequency in the 750 MHz band and secures a radiation efficiency of about −10 dB or more such that the antenna device 100a can perform a stable wireless transmission/ reception function.

Figure 11:
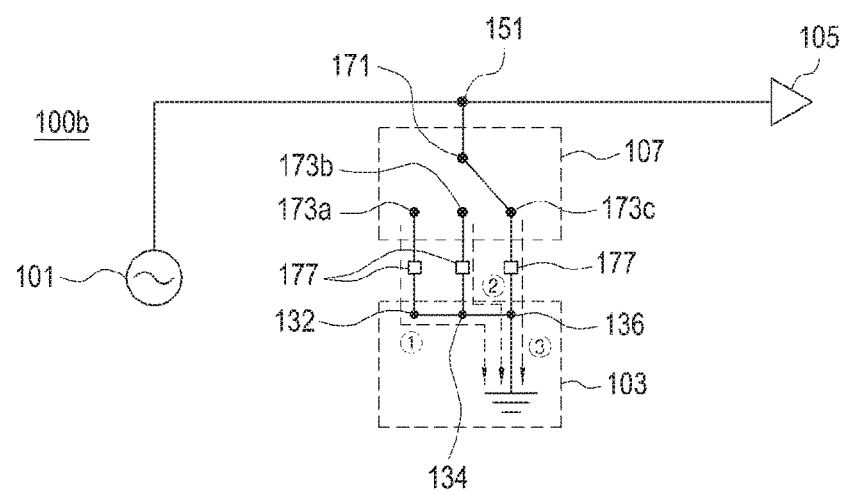
FIG. 11 is a block diagram illustrating an antenna device that is provided in an electronic device, according to a third embodiment of the present disclosure.
Figure 12:
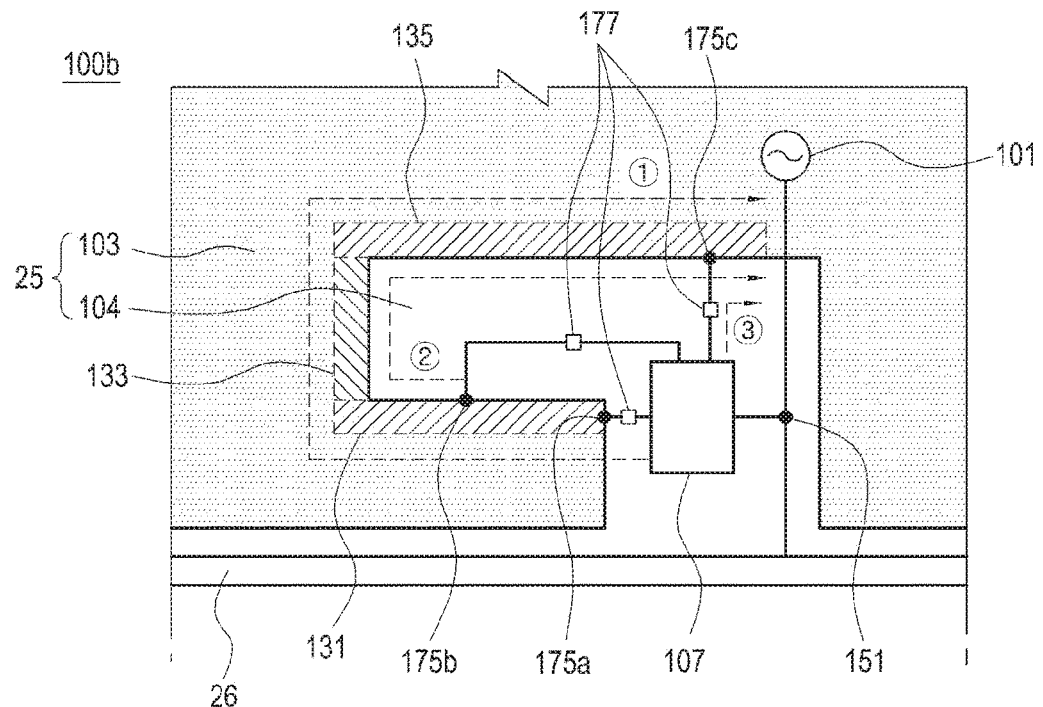
FIG. 12 illustrates a state in which matching elements are provided between the ground unit and the switching element in the antenna device illustrated in FIG. 11.

FIG. 11 is a block diagram illustrating an antenna device that is provided in an electronic device according to a third embodiment of the present disclosure. FIG. 12 illustrates a state in which matching elements are provided between the ground unit and the switching element in the antenna device illustrated in FIG. 11.

Referring to FIGS. 11 and 12, the antenna device 100b that is provided in an electronic device further includes matching elements 177 that are provided between the ground unit 103 and the switching element 107.

The matching elements 177, which have different electric characteristics, are provided on the routes that connect one of the first to third points 132, 134, and 136 of the ground unit 103 to the switching element 107. The matching elements 177 include a matching circuit that is formed of any one of lumped elements (LEs), such as a resistive element, a capacitive element, and an inductive element, or a combination of these elements.

Figure 13:
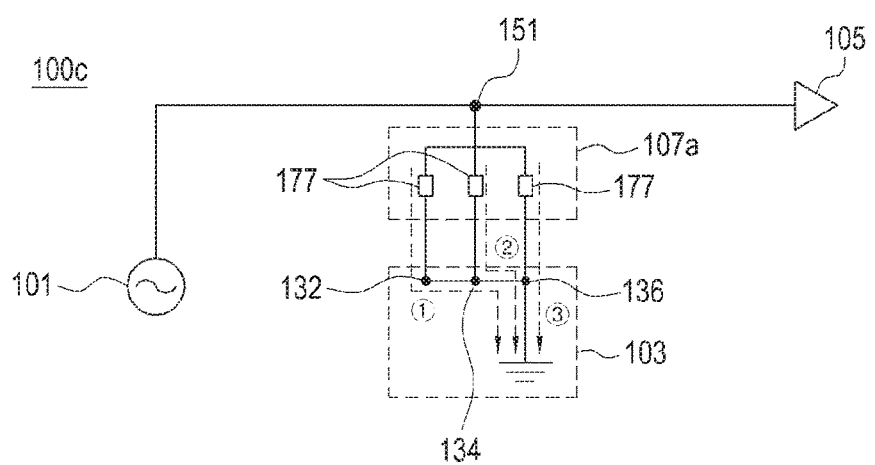
FIG. 13 is a block diagram illustrating an antenna device that is provided in an electronic device according to a fourth embodiment of the present disclosure.
Figure 14:
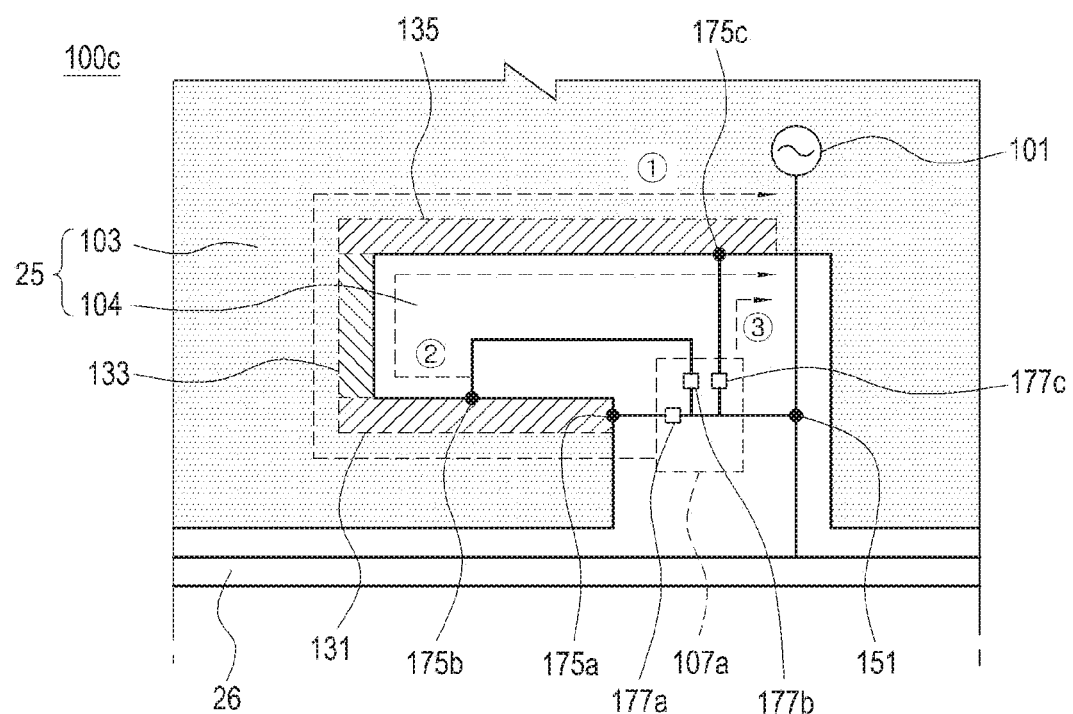
FIG. 14 illustrates a state in which the ground unit and the switching element of the antenna device illustrated in FIG. 13 are connected to each other.

FIG. 13 is a block diagram illustrating an antenna device that is provided in an electronic device according to a fourth embodiment of the present disclosure. FIG. 14 illustrates a state in which the ground unit and the switching element of the antenna device illustrated in FIG. 13 are connected to each other.

Referring to FIGS. 13 and 14, a switching element 107a, which is applied to an antenna device 100c, includes first, second and third matching elements 177a, 177b, and 177c.

The first matching element 177a is provided between the junction 151 and the first point 175a, the second matching element 177b is provided between the junction 151 and the second point 175b, and the third matching element 177c is provided between the junction 151 and the third point 175C.

The matching elements 177a, 177b, and 177c may be a matching circuit that is formed of any one of a resistive element, a capacitive element, and an inductive element, or a combination of these elements.

The switching element 107a is capable of causing a ground to be provided through a route that is provided with a matching element 177a, 177b, or 177c, which corresponds to the frequency band of signal power provided to the radiating unit 105, among the first to third routes ①, ②, or ③, thereby adjusting the resonance frequency band of the antenna device 100c. The route, which corresponds to the frequency band of signal power provided to the radiating unit 105, may be formed by any one or a combination of two or more of the first to third routes ①, ②, or ③.

Figure 15:
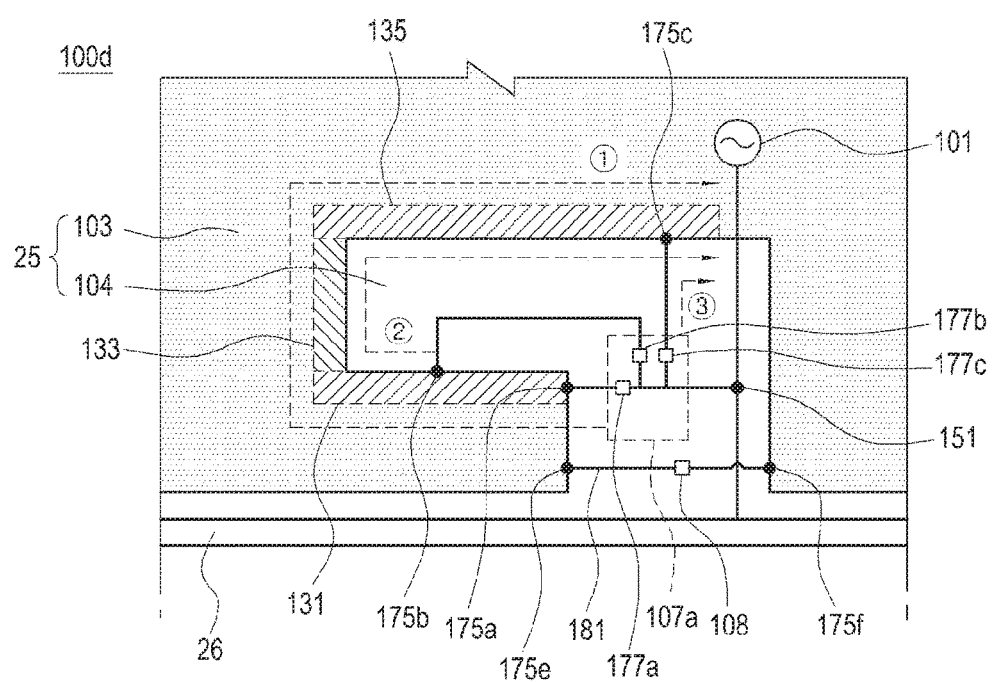
FIG. 15 is a block diagram illustrating an antenna device that is provided in an electronic device, according to a fifth embodiment of the present disclosure.

FIG. 15 is a block diagram illustrating an antenna device that is provided in an electronic device according to a fifth embodiment of the present disclosure.

Referring to FIG. 15, an antenna device 100d further includes a connecting line 181 that crosses the non-conductive region 104 that connects a fourth point 175e, and a fifth point 175f of the ground unit 103 to each other, and a second switching element 108 that is provided on the connecting line 181.

The second switching element 108 opens/closes the electric connection between the fourth point 175e and the fifth point 175f of the ground unit 103. As the second switching element 108 opens/closes the electric connection between the fourth point 175e and the fifth point 175f, the electric length of the radiating portion 26 may be changed. For example, when a first frequency band of the antenna device 100d, such as the low frequency band of about 800 MHz, is adjusted, a problem may occur in that the radiation efficiency of a second frequency band of the antenna device 100d, such as the high frequency band of about 1850 MHz, is degraded. In that case, as the second switching element 108 electrically connects or cuts off the fourth point 175e and the fifth point 175f of the ground unit 103, the radiation efficiency of the second frequency band can be stably maintained.

The second switching element 108 includes matching elements that include a matching circuit formed of any one of LEs, such as a resistive element, a capacitive element, and an inductive element, or a combination of these elements. For example, the second switching element 108 may be a capacitive element of about 1.2 pF.

FIGS. 16 and 17 are graphs representing radiating characteristics of an antenna device according to the fifth embodiment of the present disclosure.

Referring to FIG. 16, the graph indicated by G1 represents the radiation efficiency of the antenna device when the connecting line 181 is cut off by the second switching element 108 while the radiating portion 26 is provided with the ground of the first route ①. The graph indicated by G2 represents the radiation efficiency of the antenna device when the connecting line 181 is connected by the second switching element 108 while the radiating portion 26 is provided with the ground of the first route ①. The graph indicated by G3 represents the radiation efficiency of the antenna device when the second switching element 108 is a matching element, such as the capacitive element of about 1.2 pF, while the radiating portion 26 is provided with the ground of the first route ①.

Referring to FIG. 17, the graph indicated by G4 represents the radiation efficiency of the antenna device that is contrasted with graph G1 in FIG. 16 when the user grips the electronic device. The graph indicated by G5 represents the radiation efficiency of the antenna device that is contrasted with graph G2 in FIG. 16 when the user grips the electronic device. The graph indicated by G6 represents the radiation efficiency of the antenna device that is contrasted with graph G3 of FIG. 16 when the user grips the electronic device.

Upon comparing graphs indicated by G1 and G2, the radiation efficiency of the antenna device when the connecting line 181 is cut off by the second switching element 108 in a low frequency band of about 800 MHz, is obtained to be equivalent to the radiation efficiency of the antenna device when the connecting line 181 is connected by the second switching element 108. In a high frequency band of about 1800 MHz, the radiation efficiency of the antenna device is improved by connecting the connecting line 181 using the second switching element 108.

Upon comparing the graphs indicated by G1 and G3, when the second switching element 108 is the matching element, such as a capacitive element of about 1.2 pF, the radiation efficiency of the antenna device is similar to the radiation efficiency when the connecting line 181 is cut off by the second switching element 108 in the low frequency band, and is similar to the radiation efficiency of the antenna device when the connecting line 181 is connected by the second switching element 108 in the high frequency band. When the second switching element 108 is configured using a matching element, a good radiation efficiency is obtained in both the low frequency band and the high frequency band.

Upon comparing the graphs indicated by G4 and G5 when the user grips the electronic device, the radiation efficiency of the antenna device when the connecting line 181 is cut off by the second switching element 108 in a low frequency band of about 900 MHz, is obtained to be equivalent to the radiation efficiency of the antenna device when the connecting line 181 is connected by the second switching element 108. the radiation efficiency of the antenna device is improved by connecting the connecting line 181 using the second switching element 108 in a high frequency band of about 1900 MHz.

Upon comparing the graphs indicated by G4 and G6, when the second switching element 108 is the capacitive element of about 1.2 pF, the radiation efficiency of the antenna device is similar to the radiation efficiency when the connecting line 181 is cut off by the second switching element 108 in the low frequency band, and is similar to the radiation efficiency of the antenna device when the connecting line 181 is connected by the second switching element 108 in the high frequency band. When the second switching element 108 is configured using a matching element, a good radiation efficiency is obtained in both the low frequency band and the high frequency band.

Figure 18:
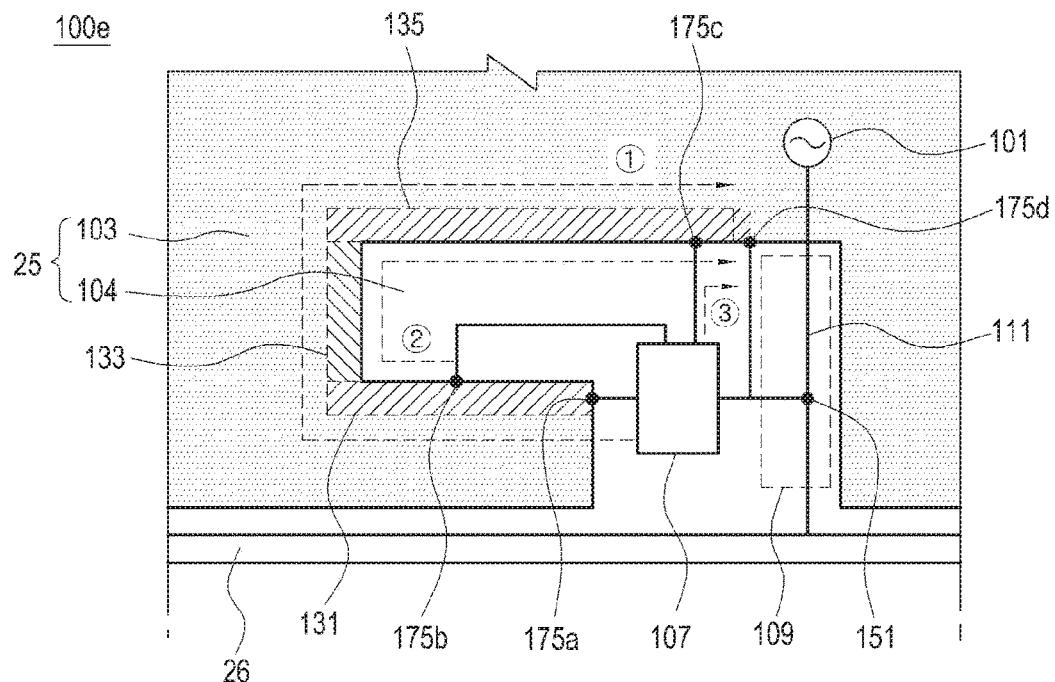
FIG. 18 is a block diagram illustrating an antenna device that is provided in an electronic device according to a sixth embodiment of the present disclosure.
Figure 19:
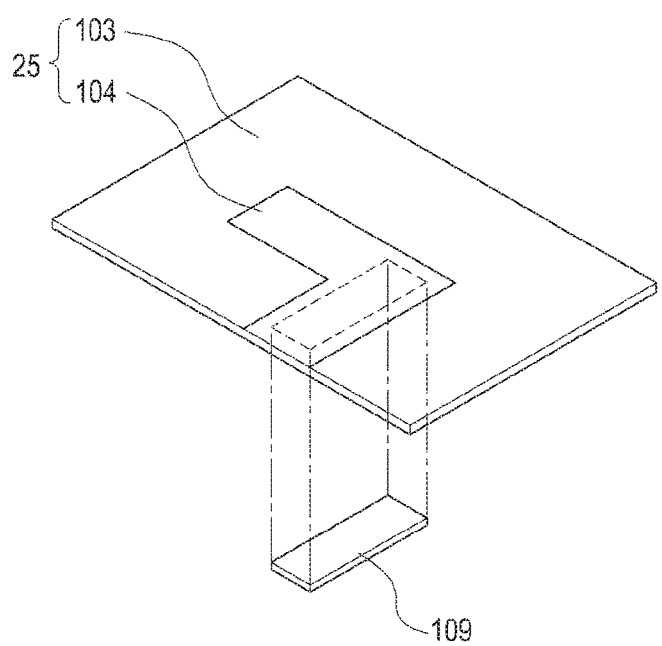
FIG. 19 is an exploded perspective view illustrating a second circuit board and a conductor of FIG. 18.

FIG. 18 is a block diagram illustrating an antenna device that is provided in an electronic device according to a sixth embodiment of the present disclosure. FIG. 19 is an exploded perspective view illustrating a second circuit board and a conductor of FIG. 18.

Referring to FIGS. 18 and 19, an antenna device 100e further includes a power feeding line 111 and a conductor 109.

The power feeding line 111 electrically connects the power feeding unit 101 and the radiating portion 26 of the case to each other. For example, the power feeding line 111 is connected to the radiating portion 26 of the case via the non-conductive region 104 of the second circuit board 25 while being connected to the power feeding unit 101. The radiating portion 26 of the case is used as the radiating unit by being connected to the power feeding unit 101 via the power feeding line 111. The power feeding line 111 may also be used as a portion of the radiating unit.

The conductor 109 is positioned adjacent to the power feeding line 111, thereby providing a ground. For example, the conductor 109 is arranged to correspond to the power feeding line 111 on the rear face of the second circuit board 25 and thus adjusts the electric length of the antenna device 100e. The radiation characteristic of the antenna device 100e, which is provided with the conductor 109, will be described below with reference to the drawings.

Figure 20:
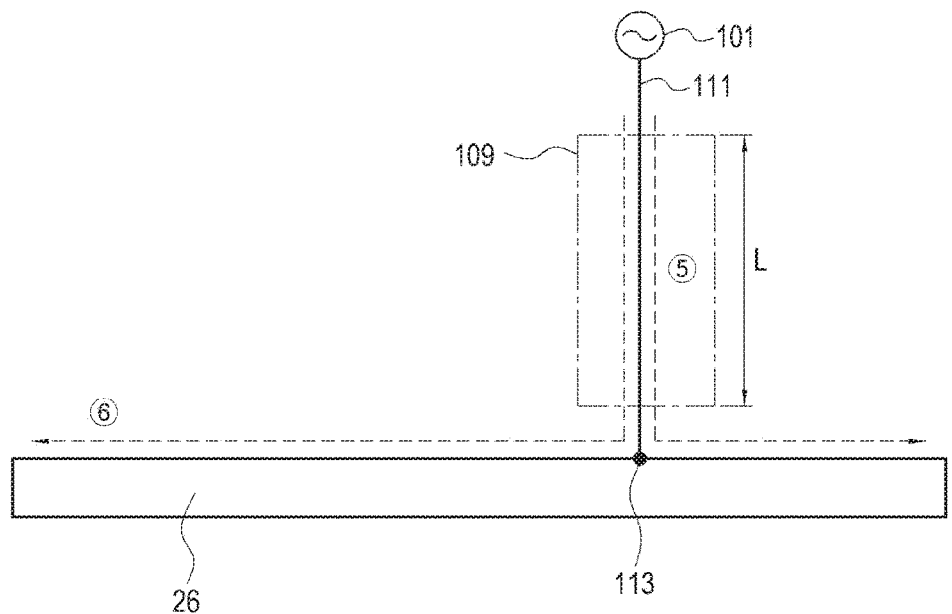
FIG. 20 illustrates a power feeding line, a portion of a case, and the conductor of FIG. 18
Figure 21:
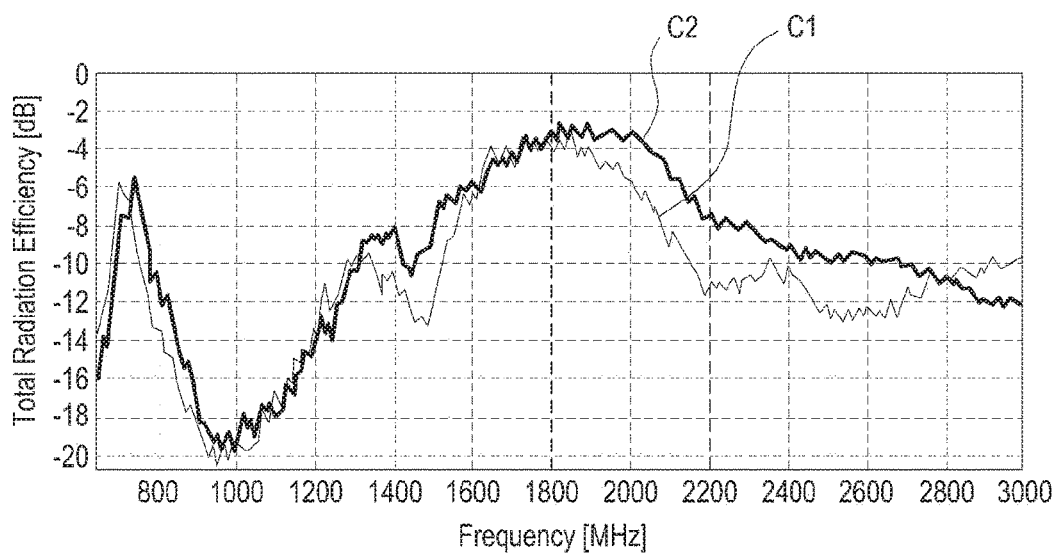
FIG. 21 is a graph representing radiating characteristics of an antenna device according to the sixth embodiment of the present disclosure.

FIG. 20 illustrates the power feeding line, the portion of a case, and the conductor of FIG. 18. FIG. 21 is a graph representing a radiating characteristic of the antenna device according to the sixth embodiment of the present disclosure.

Referring to FIG. 20, the power feeding line 111 may be electrically connected to a connecting point 113 of the radiating portion 26 of the case. However, the connecting point 113 may be provided with a connecting member that is arranged on at least one of the power feeding line 111 and the radiating portion 26 of the case. The connecting member may be an elastic member, such as a C-clip. The connecting member may electrically connect the power feeding unit 111 and the radiating portion 26 of the case to each other.

The antenna device 100e may form a resonance frequency of a high frequency band by using, as a radiating unit, a portion that is set as a fifth route ⑤ that is formed from the connecting point 113 to one end of the radiating portion 26 of the case after passing through the power feeding line 111 from the power feeding unit 101. The antenna device 100e may form a resonance frequency of a low frequency band, such as a frequency band that is lower than the resonance frequency formed by the portion that is set by the fifth route ⑤) by using, as a radiating unit, a portion that is set by a sixth route ⑥ that is formed from the connecting point 113 to the other end of the radiating portion 26 of the case after passing through the power feeding line 111 from the power feeding unit 101. The physical length from the connecting point 113 to the other end of the radiating portion 26 of the case may be longer than the physical length from the connecting point 113 to the one end of the radiating portion 26 of the case.

The conductor 109 is provided below the power feeding line 111, thereby assisting in reducing the electric length that is set by the fifth route ⑤, such as in proportion to the physical length L of the conductor 109. As illustrated in FIG. 21, the radiation efficiency C2 of the antenna device, which is provided with the conductor 109, is improved, compared to the radiation efficiency C1 of the conventional antenna device that is not provided with the conductor 109, in the frequency band of about 1800 to 2200 MHz.

As described above, according to the sixth embodiment of the present disclosure, since the conductor 109 is arranged to be adjacent to the power feeding line 111 without changing the physical length of the radiating portion 26 of the case, the antenna device 100e changes the resonance frequency band or improves the radiation efficiency.

Figure 22:
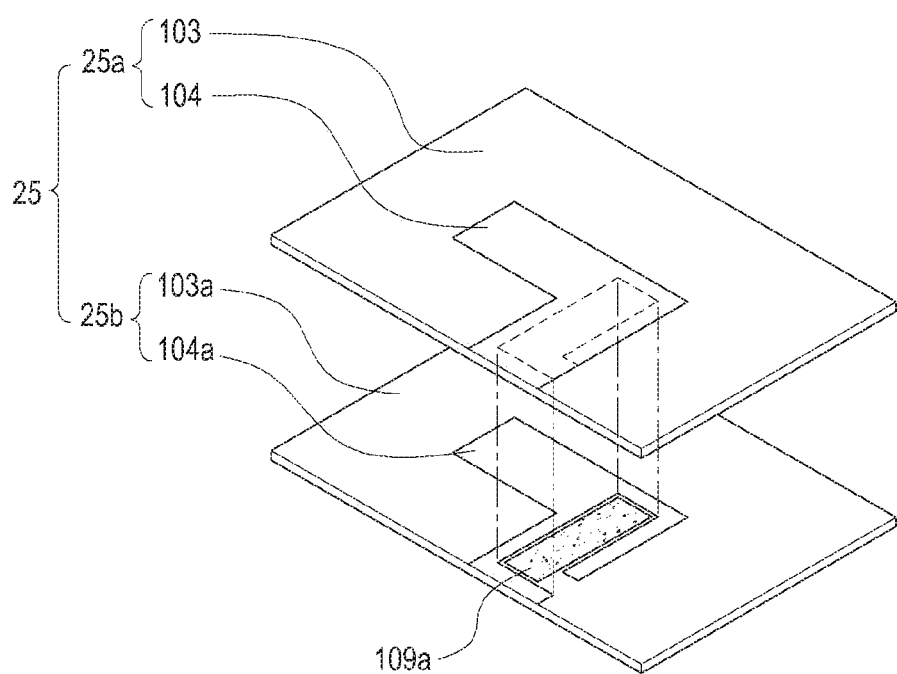
FIG. 22 is an exploded perspective view illustrating the second circuit board and the conductor in an antenna device according to a seventh embodiment of the present disclosure.

FIG. 22 is an exploded perspective view illustrating the second circuit board and the conductor in an antenna device according to a seventh embodiment of the present disclosure.

Referring to FIG. 22, the second circuit board 25 includes a first layer 25a that includes the conductive region 103 and the non-conductive region 104, and a second layer 25b that includes a conductor 109a that is arranged to be adjacent to the non-conductive region 104.

The second layer 25b includes a second conductive region 103a that corresponds to the conductive region 103 of the first layer 25a, and further includes the conductor 109a in a second non-conductive region 104a that corresponds to the non-conductive region 104 of the first layer 25a. The conductor 109a is connected to the second conductive region 103a and thereby provides a ground.

Figure 23:
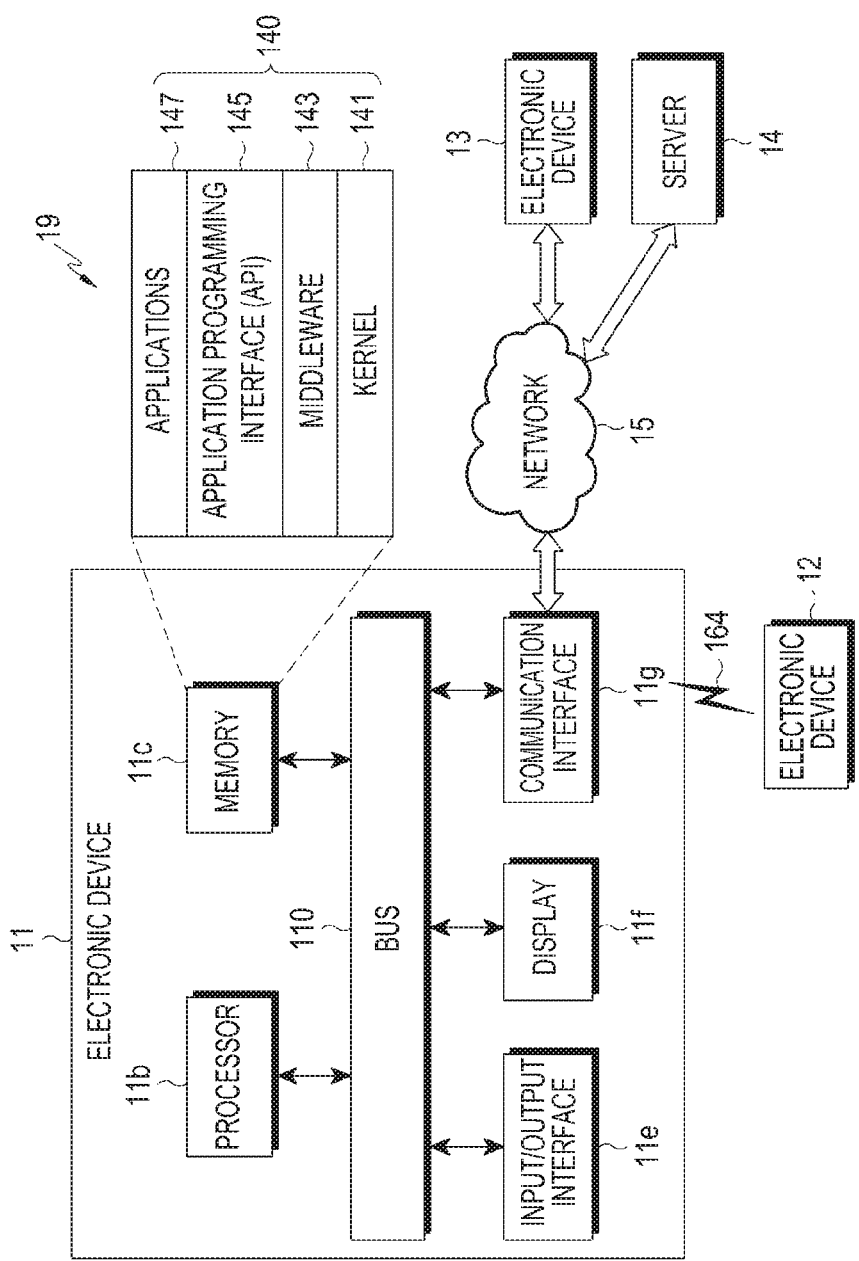
FIG. 23 illustrates a network environment that includes an electronic device according to embodiments of the present disclosure.

FIG. 23 illustrates a network environment that includes an electronic device according to embodiments of the present disclosure.

In FIG. 23, an electronic device 11 within a network environment 19 will be described. The electronic device 11 includes a bus 110, a processor 11b, a memory 11c, an input/output interface 11e, a display 11f, and a communication interface 11g. In an embodiment, the electronic device 11 may omit at least one of the above-mentioned components or may include additional components.

The bus 110 includes a circuit that connects the above-mentioned components 11b, 11c, 11e, 11f and 11g and transmits communication, such as a control message and/or data, between the components.

The processor 11b includes one or more of a central processing unit (CPU), an application processor (AP), and a communication processor (CP). The processor 11b executes an arithmetic operation or data processing that is related to a control and/or communication of one or more other components of the electronic device 11.

The memory 11c includes a volatile memory and/or a non-volatile memory, and stores commands or data related to other components of the electronic device 11. According to one embodiment, the memory 11c stores software and/or a program 140. The program 140 includes a kernel 141, a middleware 143, an application programming interface (API) 145, and application programs (hereinafter, referred to as "applications") 147. At least one of the kernel 141, the middleware 143, and the API 145 may be referred to as an operating system (OS).

The kernel 141 controls or manages system resources, such as the bus 110, the processor 11b, or the memory 11c that are used for executing operations or functions implemented in the other programs, such as the middleware 143, the API 145, or the applications 147. The kernel 141 provides an interface that allows the middleware 143, the API 145, or the applications 147 to access individual components of the electronic device 11 and thereby control or manage the system resources.

The middleware 143 performs an intermediary role such that the API 145 or the applications 147 may communicate with the kernel 141 and thereby exchange data.

The middleware 143 processes, according to priority, one or more task requests that have been received from the applications 147. For example, the middleware 143 may assign the priority to be capable of using a system resource of the electronic device 11 to at least one of the applications 147. For example, the middleware 143 performs scheduling or load balancing for the one or more task requests by processing the one or more requests according to the assigned priority.

The API 145 allows the applications 147 to control functions provided from the kernel 141 or the middleware 143, and includes one or more interfaces or functions, such as commands for a file control, a window control, an image processing, or a character control.

The input/output interface 11e transmits commands or data, which are entered from a user or any other external device, to the other component(s) of the electronic device 11, and outputs commands or data, which are received from the other component(s) of the electronic device 11, to the user of the other external device.

The display 11f includes a liquid crystal display (LCD), a light emitting diode (LED) display, an organic light emitting diode (OLED) display, a micro-electro-mechanical systems (MEMS) display, or an electronic paper display. The display 11f displays various contents, such as text, image, video, icon, or symbol to the user. The display 11f includes a touch screen which receives a touch, gesture, proximity, or hovering input that is made using an electronic pen or a part of the user's body.

The communication interface 11g sets communication between the electronic device 11 and an external device, such as a first external electronic device 12, a second external device 13, or a server 14. For example, the communication interface 11g communicates with the external device by being connected with a network 15 through wired or wireless communication.

The wireless communication uses at least one of LTE, LTE advanced (LTE-A), code division multiple access (CDMA), wideband CDMA (WCDMA), universal mobile telecommunication system (UMTS), wireless broadband (WiBro), or global system for mobile communication (GSM), as a cellular communication protocol, and may include short range communication 164 such as wireless fidelity (WiFi), near field communication (NFC), or global navigation satellite system (GNSS).

GNSS includes at least one of a global positioning system (GPS), global navigation satellite system (Glonass), beidou navigation satellite system (hereinafter, "Beidou"), Galileo, and the European global satellite-based navigation system, according to a use area or band width. Hereinafter, in embodiments of the present disclosure, "GPS" and "GNSS" are interchangeably used. The wired communication may use at least one of universal serial bus (USB), high definition multimedia interface (HDMI), recommended standard 232 (RS-232), and plain old telephone service (POTS). The network 15 includes a telecommunication network, a computer network such as LAN or WAN, the Internet, and a telephone network.

Each of the first and second external electronic devices 12 and 13 may be a type of device that is the same as, or different from, the electronic device 11. According to one embodiment, the server 14 includes a group of one or more servers. All or some of the operations to be executed by the electronic device 11 may be executed by another electronic device or a plurality of other electronic devices. When the electronic device 11 should perform a certain function or service automatically or by a request, the electronic device 11 may request some functions or services that are associated therewith from the other electronic devices instead of, or in addition to, unilaterally executing the functions or service.

The other electronic devices execute the requested functions or additional functions, and transmit the results to the electronic device 11. The electronic device 11 provides the requested functions or services by processing the received results as they are or additionally. For this purpose a cloud computing technique, a distributed computing technique, or a client-server computing technique may be used.

Figure 24:
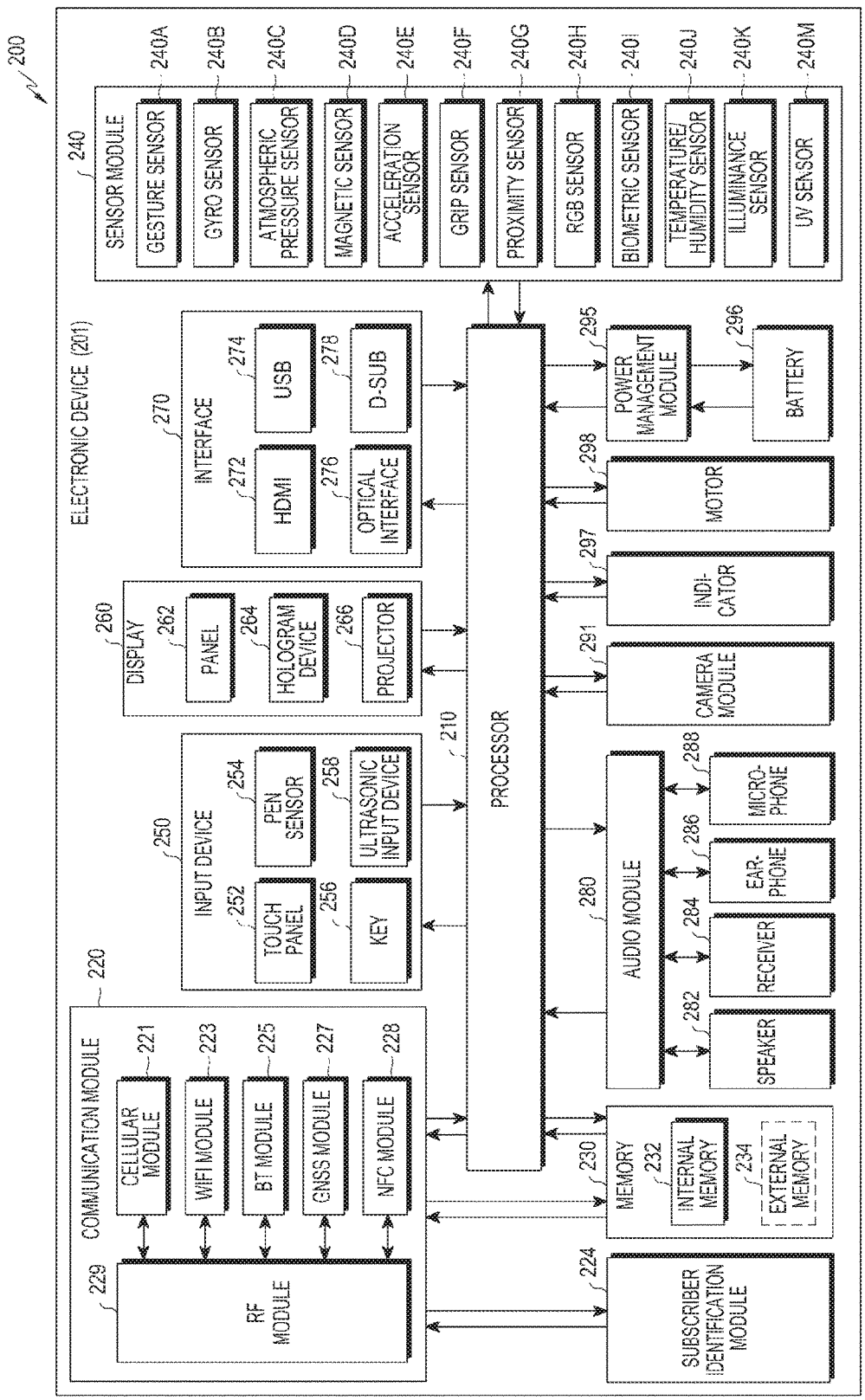
FIG. 24 is a block diagram illustrating an electronic device according to embodiments of the present disclosure.

FIG. 24 is a block diagram illustrating an electronic device 201 according to embodiments of the present disclosure. The electronic device 201 includes all or a portion of the electronic device 10 illustrated in FIG. 3. The electronic device 201 includes at least one processor, such as an AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 drives an operating system or an application and thereby controls a plurality of hardware or software components connected thereto, and also performs various data processing and arithmetic operations. The AP 210 may be implemented by a system-on-chip (SoC), and may further include a graphic processing unit (GPU) and/or an image signal processor. The AP 210 includes at least some components, such as the cellular module 221, among the components illustrated in FIG. 24. The AP 210 loads a command or data received from at least one of the other components, such as the non-volatile memory, in a volatile memory to process the command and data, and stores various data in the non-volatile memory.

The processor 210 adjusts the resonance frequency of the antenna device by operating the switching element 107.

The communication module 220 has a configuration that is the same as, or similar to, a communication interface and includes a cellular module 221, a WiFi module 223, a Bluetooth module 225, a GNSS module 227, an NFC module 228, and a radio frequency (RF) module 229.

The cellular module 221 provides a voice call, a video call, a message service, or an internet service through a communication network. According to one embodiment, the cellular module 221 performs discrimination and authentication of the electronic device 201 within the communication network by using the SIM card 224. According to one embodiment, the cellular module 221 performs at least some of functions that may be provided by the AP 210, and includes a communication processor (CP).

Each of the WiFi module 223, the Bluetooth™ module 225, the GNSS module 227, and the NFC module 228 includes a processor to process data transmitted/received through a corresponding module. According to an embodiment, at least two of the cellular module 221, the WiFi module 223, the Bluetooth module 225, the GNSS module 227, and the NFC module 228 may be incorporated in a single integrated chip (IC) or an IC package.

The RF module 229 transmits/receives a communication signal, such as an RF signal, and includes a transceiver, a power amp module (PAM), a frequency filter, a low noise amplifier (LNA), or an antenna. According to another embodiment, at least one of the cellular module 221, the WiFi module 223, the Bluetooth module 225, the GNSS module 227, and the NFC module 228 transmits/receives an RF signal through one or more separate RF modules. The radiating unit is connected to the RF module and is thereby fed with power and provides a wireless transmission/reception function.

The SIM card 224 includes a SIM (i.e., a SIM card) and/or an embedded SIM, and may also include intrinsic identification information, such as integrated circuit card identifier (ICCID)) or subscriber information, such as international mobile subscriber identity (IMSI).

The memory 230 includes an internal memory 232 or an external memory 234, and includes at least one of a volatile memory, such as dynamic RAM (DRAM), static RAM (SRAM), or synchronous DRAM (SDRAM), a non-volatile memory, such as one time programmable ROM (OTPROM), programmable ROM (PROM), erasable and programmable ROM (EPROM), electrically erasable and programmable ROM (EEPROM), mask ROM, flash ROM, flash memory, such as NAND flash memory, or NOR flash memory, hard drive, or solid state drive (SSD).

The external memory 234 may further include a flash drive, such as compact flash (CF), secure digital (SD), micro secure digital (Micro-SD), mini secure digital (Mini-SD), extreme digital (xD), multi-media card (MMC), or memory stick. The external memory 234 may be functionally and/or physically connected to the electronic device 201 through various interfaces.

The sensor module 240 measures a physical quantity or senses an operating status of the electronic device 201, and then converts the measured or sensed information into electric signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, such as a red, green, blue (RGB) sensor, a biometric sensor 240I, a temperature/humidity sensor 240J, an illuminance sensor 240K, and an ultra-violet (UV) sensor 240M. Additionally or alternatively, the sensor module 240 includes an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors incorporated therein. In an embodiment, the electronic device 201 further includes a processor that controls the sensor module 240 as a part of or separate from the AP 210, thereby controlling the sensor module 240 while the AP 210 is in the sleep state.

The input device 250 includes a touch panel 252, a (digital) pen sensor 254, a key 256, and an ultrasonic input device 258. At least one of a capacitive type touch panel, a resistive type touch panel, an infrared type touch panel, and an ultrasonic type panel may be used as the touch panel 252. The touch panel 252 may further include a control circuit, as well as a tactile layer that provides a tactile reaction to the user.

The (digital) pen sensor 254 may be a portion of the touch panel, or may include a separate recognition sheet. The key 256 includes a physical button, an optical key, or a keypad. The ultrasonic input device 258 senses, through a microphone 288 in the electronic device 201, ultrasonic waves that are generated by an input tool, and thereby confirms data corresponding to the sensed ultrasonic waves.

The display 260 includes a panel 262, a hologram device 264, and a projector 266. The panel 262 may be implemented to be flexible, transparent, or wearable, and configured as a single module with the touch panel 252. The hologram device 264 displays a stereoscopic image in the air using interference of light. The projector 266 projects light onto a screen and thereby displays an image. The screen may be located inside or outside the electronic device 201. According to one embodiment, the display 260 further includes a control circuit that controls the panel 262, the hologram device 264, and the projector 266.

The interface 270 includes a high-definition multimedia interface (HDMI) 272, a universal serial bus (USB) 274, an optical interface 276, and a d-subminiature (D-sub) 278. The interface 270 is included in a communication interface, and additionally or alternatively, includes a mobile high-definition link (MHL) interface, a secure digital (SD) card/multimedia card (MMC) interface, or an infrared data association (IrDA) standard interface.

The audio module 280 bi-directionally converts sound and electric signals. At least some components of the audio module 280 may be included in an input/output interface. The audio module 280 processes sound information input or output through a speaker 282, a receiver 284, an earphone 286, or the microphone 288.

The camera module 291 is capable of photographing a still image and a video image, and according to one embodiment, the camera module 291 includes at least one image sensor, such as a front sensor or a rear sensor, a lens, an image signal processor (ISP), and a flash, such as an LED or xenon lamp.

The power management module 295 manages the electric power of the electronic device 201. According to one embodiment, the power management module 295 includes a power management integrated circuit (PMIC), a charger integrated circuit (IC), or a battery gauge. The PMIC may be configured in a wired and/or wireless charge type. The wireless charge type includes a magnetic resonance type, a magnetic induction type, or an electromagnetic wave type, and may further include an additional circuit for wireless charging, such as a coil loop, a resonance circuit, or a rectifier. The battery gauge measures the residual capacity of the battery 296, and a voltage, a current, or a temperature during the charge. The battery 296 includes a rechargeable battery and/or a solar battery.

The indicator 297 indicates a specific status of the electronic device 201 or of a part thereof, such as a booting status, a message status, or a charged status. The motor 298 converts an electric signal into a mechanical vibration, and generates a vibration or a haptic effect. The electronic device 201 includes a processor, such as a GPU, to support a mobile TV. The processor to support a mobile TV processes media data according to the standards of digital multimedia broadcasting (DMB), digital video broadcasting (DVB), or mediaFlow™.

Each of the above-described component elements are hardware or a combination of hardware and software according to the present disclosure, may be configured with one or more components, and the names of the corresponding component elements may vary based on the type of electronic device. The electronic device according to embodiments of the present disclosure includes at least one of the aforementioned elements. Some elements may be omitted or additional elements may be further included in the electronic device. Some of the hardware components according to embodiments may be combined into one entity, which performs functions identical to those of the relevant components before being combined.

Figure 25:
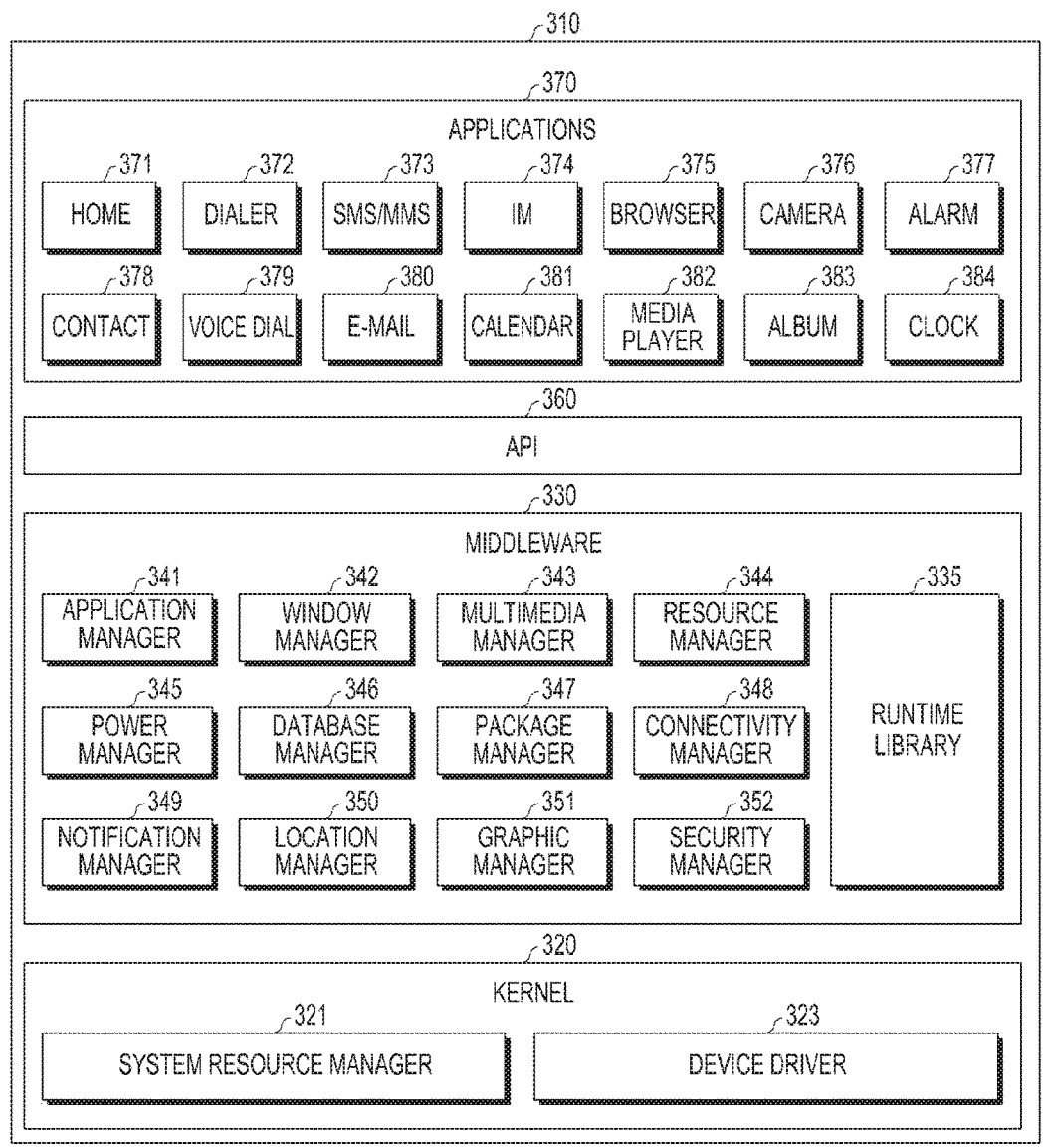
FIG. 25 is a block diagram illustrating a program module of an electronic device according to embodiments of the present disclosure.

FIG. 25 is a block diagram illustrating a program module of an electronic device according to embodiments of the present disclosure. According to one embodiment, a program module 310 includes an OS that controls resources associated with an electronic device and/or various applications that are driven on the operating system. The operating system may be Android, iOS, Windows, Symbian, Tizen, or Bada.

The program module 310 includes a kernel 320, a middleware 330, an API 360, and applications 370. At least a part of the program module 310 may be preloaded on the electronic device, or may be downloaded from an external electronic device.

The kernel 320 includes a system resource manager 321 and/or a device driver 323. The system resource manager 321 performs a control, allocation, or recovery of a system resource, and includes a process management unit, a memory management unit, or a file system management unit. The device driver 323 includes a display driver, a camera driver, a Bluetooth™ driver, a common memory driver, a USB driver, a keypad driver, a WiFi driver, an audio driver, or an inter-process communication (IPC) driver.

The middleware 330 provides a function that is commonly required by the applications 370, or provides various functions to the applications 370 through the API 360 such that the applications 370 can efficiently use the limited system resources within the electronic device. According to one embodiment, the middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes a library module that is used by a compiler in order to add a new function through a program language while the applications 370 are executed. The runtime library 335 performs input/output management, memory management, or an arithmetic function.

The application manager 341 manages a life cycle of at least one application among the applications 370. The window manager 342 manages a GUI resource that is used in a screen. The multimedia manager 343 obtains a format required for reproducing various media files, and performs encoding or decoding of the media files by using a codec that is suitable for the corresponding format. The resource manager 344 manages a resource, such as a source code, a memory, or a storage space, of at least one application among the applications 370.

The power manager 345 is operated together with a basic input/output system (BIOS) and thereby manages a battery or a power source, and provides power information that is required for operating the electronic device. The database manager 346 generates, retrieves, or changes a database to be used by at least one application among the applications 370. The package manager 347 manages the installation or update of an application that is distributed in the form of a package file.

The connectivity manager 348 manages a wireless connection of WiFi or Bluetooth. The notification manager 349 displays or notifies of events, such as an arrival message, appointment, and proximity notification, in a manner that does not disturb the user. The location manager 350 manages position information of the electronic device. The graphic manager 351 manages a graphic effect to be provided to the user or a user interface associated therewith. The security manager 352 provides all security functions required for system security, or user authentication. According to one embodiment, when the electronic device includes a phone function, the middleware 330 includes a telephony manager that manages a voice or video call function of the electronic device.

The middleware 330 includes a middleware module that forms a combination of various functions of the above-described components. The middleware 330 provides a module that is specialized for each type of operation system in order to provide differentiated functions. The middleware 330 dynamically deletes some of the existing components or adds new components.

The API 360 is a collection of API programming functions, and may be provided in different configurations according to operation systems. For example, Android or iOS provides one API set for each platform and Tizen provides two or more API sets for each platform.

The applications 370 include one or more applications that can execute the functions of home 371, dialer 372, short message service/multimedia messaging service (SMS/MMS) 373, instant message (IM) 374, browser 375, camera 376, alarm 377, contact 378, voice dial 379, e-mail 380, calendar 381, media player 382, album 383, clock 384, health care, such as measurement of a quantity of motion or blood sugar, or provision of environmental information such as atmospheric pressure, humidity, or temperature information.

According to one embodiment, the applications 370 include an application that supports information exchange between the electronic device and the external electronic devices (i.e., an "information exchange application"). The information exchange application includes a notification relay application that transmits specific information to the external electronic devices, or a device management application that manages the external electronic devices.

For example, the notification relay application includes a function of relaying notification information generated from any other application of the electronic device to the external electronic devices. The notification relay application receives notification information from an external electronic device, and provides the notification information to the user.

The device management application manages at least one function of an external electronic device that communicates with the electronic device, such as turn-on/turn-off of all or part of the external electronic device or adjustment of brightness of a display, an application operated in the external electronic device, or a service provided by the external electronic device, such as a telephony or message service.

According to one embodiment, the applications 370 include an application designated according to an attribute of an external electronic device, such as a healthcare application of a mobile medical device. In other embodiments, the applications 370 include an application received from an external electronic device, and a preloaded application or a third party application that is capable of being downloaded from the server. Names of the elements of the program module 310, according to the above-described embodiments of the present disclosure, may change depending on the type of OS.

According to embodiments of the present disclosure, at least some components of the program module 310 may be implemented in software, firmware, hardware, or a combination of two or more thereof. At least some of the program module 310 may be implemented by the processor 210. At least a part of the program module 310 includes a module, a program, a routine, a set of instructions, and/or a process for performing one or more functions.

The term "module" used in embodiments of the present disclosure may refer to, for example, a "unit" including one of hardware, software, and firmware, or a combination of two or more of the hardware, software, and firmware. The term "module" may be interchangeably used with the term "unit", "logic", "logical block", "component", or "circuit", may be a unit of an integrated component element or a part thereof, may be a unit for performing one or more functions or a part thereof, and may be mechanically or electronically implemented. For example, the "module" according to the present disclosure includes at least one of an application-specific integrated circuit (ASIC) chip, a field-programmable gate array (FPGA), and a programmable-logic device for performing known or future-developed operations.

According to various embodiments, at least some of the devices or the method according to the present disclosure may be implemented by a command stored in a computer-readable storage medium in a programming module form. The instruction, when executed by a processor, may cause the one or more processors to execute the function corresponding to the instruction. The computer-readable storage medium may be the memory 130.

The computer readable recoding medium may include a hard disk, a floppy disk, magnetic media, such as a magnetic tape, optical media, such as a compact disc read only memory (CD-ROM) and a digital versatile disc (DVD), magneto-optical media, such as a floptical disk, a hardware device, such as a ROM or a random access memory (RAM), or a flash memory. The program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to embodiments of the present disclosure may be executed sequentially, in parallel, repeatedly, or in a heuristic manner. Some operations may be executed according to another order or may be omitted, or other operations may be added.

According to embodiments of the present disclosure, the portable electronic device 1 includes a housing, a printed circuit board, a switching element, a communication module, a first electric path, a second electric path, a third electric path, and a fourth electric path.

The housing is an external housing that includes a first face, a second face that is opposite to the first face, and a side wall that encloses a space between the first face and the second face. For example, the first face is one face of the front cover 3, the second face is one face of the rear cover 8, and the side wall is the frame 2b of the case 2. The side wall includes a first portion that includes metal. The first portion 1 is the radiating portion 26 of the case illustrated in FIG. 3.

The printed circuit board forms a face, which is substantially parallel to the first face, within the external housing, and includes a first region including a ground and a second region including an insulating material. The printed circuit board may be the second circuit board 25 illustrated in FIG. 3, the first region may be the conductive region 103 illustrated in FIG. 3, the second region may be the non-conductive region 104 illustrated in FIG. 3. The ground may be any of the first to third ground portions 131, 133, and 135 illustrated in FIG. 4. The ground 131, 133, or 135 includes a portion that encloses at least a portion of the second region 104.

The switching element 107 includes the first terminal 171, the second terminal 173a, and the third terminal 173b.

The communication module 220 may be included in the housing, and includes the RF module 229.

The first electric path interconnects the communication module and the first position of the first portion. The first position of the first portion 1 may be the connecting point 113.

The second electric path is connected to the first terminal 171 of the switching element 107, and is connected to the electric path in the second region 104. The second electric path is connected between the junction 151 and the first terminal 171.

The third electric path is connected to the second terminal 173a of the first switching element 107 and the first point 175a of the ground 131, 133, or 135.

The fourth electric path is connected to the third terminal 173b of the first switching element 107 and the second point 175b of the ground 131, 133, or 135.

The ground 131, 133, or 135 includes an enclosing portion that encloses at least a portion of the second region 104, and the first point 175a and the second point 175b may be arranged on the enclosing portion to be spaced apart from each other.

The switching element 107 y further includes the fourth terminal 173c, and the electronic device 10 includes a fifth electric path that is connected to the fourth terminal 173c of the switching element 107 and the third point 175c of the ground 131, 133, or 135.

The first point 175a, the second point 175b, and the third point 175c are spaced from each other on the enclosing portion of the ground 131, 133, or 135 that encloses the second region 104.

The electronic device 10 further includes a fifth electric path that directly connects the third point 175c of the ground 131, 133, or 135 and the second electric path to each other.

The fifth electric path passes through the connecting line 181 illustrated in FIG. 15, crosses a portion of the second region 104, and includes at least one of the switching element 108 and a passive element. For example, the passive element may be the matching element.

As described above, according to embodiments of the present disclosure, an antenna device includes a power feeding unit, a ground unit, a radiating unit that is electrically connected to the power feeding unit, and a switching element that selects one or more points from a plurality of different points of the ground unit and connects the radiating unit to the one or more points.

The switching element includes a first terminal that is connected to one junction between the power feeding unit and the radiating unit.

The switching element may further include a plurality of second terminals that are arranged to correspond to different points on the ground unit, respectively, and the switching element may electrically connect the first terminal to one of the second terminals.

The switching element may connect the radiating unit to the ground unit by connecting any one of the second terminals to the first terminal.

An electric length of the radiating unit may be set depending on a position of a second terminal that is connected to the first terminal.

The ground unit includes a first ground portion that extends in one direction, a second ground portion that extends from the first ground portion, and a third ground portion that extends from the second ground portion and is arranged to be adjacent to the third ground portion, the switching element includes a plurality of second terminals that are arranged to correspond to different points on the ground unit, respectively, and the first terminal may be selectively connected to one of the second terminals.

The switching element may connect the radiating unit to the ground unit by connecting any one of the second terminals to the first terminal.

An electric length of the radiating unit 105 may be set depending on a position of a second terminal that is connected to the first terminal.

The second terminals may be arranged at a first point that is positioned at one end of the first ground portion, at least one second point that is positioned at a portion that is different from the first point of the first ground portion, and at least one third ground portion that is positioned in any one portion of the third ground portion, respectively.

The antenna device may further include a circuit board that includes a conductive region that is provided with the ground unit, and a non-conductive region that is formed among the first to third ground portions.

The antenna device may further include a power feeding line that interconnects the power feeding unit and the radiating unit, and a conductor that provides a ground adjacent to the power feeding line. The conductor may change a resonance frequency band of the radiating unit.

The antenna device may further include a ground line that bypasses the switching unit and connects the radiating unit to the ground unit.

The antenna device may further include a circuit board that includes a non-conductive region, and a conductive region that includes a ground unit that is formed to enclose at least a portion of the non-conductive region.

The plurality of different points of the ground unit may be positioned in a portion where the non-conductive region and the conductive region are in contact with each other.

The circuit board includes a first layer that includes a power feeding line that interconnects the power feeding unit and the radiating unit, and a second layer that includes a conductor adjacent to the power feeding line of the first layer.

An electronic device includes a processor; and an antenna device. The antenna device includes a power feeding unit, a ground unit, a radiating unit that is electrically connected to the power feeding unit, and a switching element that selects one or more points from a plurality of different points of the ground unit and connects the radiating unit to the one or more points. The processor adjusts a resonance frequency of the antenna device by operating the switching element.

The first terminal of the switching element may be connected to one junction between the power feeding unit and the radiating unit.

The ground unit includes a first ground portion that extends in one direction, a second ground portion that extends from the first ground portion, and a third ground portion that extends from the second ground portion parallel to the first ground portion. The switching element includes a plurality of second terminals that are arranged to correspond to different points on the ground unit, respectively, and the first terminal may be selectively connected to one of the second terminals.

An electronic device may further include a circuit board that includes a conductive region that is provided with the ground unit, and a non-conductive region that is formed among the first to third ground portions.

The radiating unit includes a portion of a case of the electronic device.

The antenna device may further include a power feeding line that interconnects the power feeding unit and the radiating unit, and a conductor that is positioned below the power feeding line to provide a ground. The conductor may change an electric length of the radiating unit.

The antenna device may further include a ground line that bypasses the switching unit and connects the radiating unit to the ground unit.

An electronic device may further include a circuit board that includes a non-conductive region, and a conductive region that includes a ground unit that is formed to enclose at least a portion of the non-conductive region.

The plurality of different points of the ground unit may be positioned in a portion where the non-conductive region and the conductive region are in contact with each other.

The circuit board includes a first layer that includes a power feeding line that interconnects the power feeding unit and the radiating unit, and a second layer that includes a conductor adjacent to the power feeding line of the first layer.

A portable electronic device includes an external housing that includes a first face, a second face that is opposite to the first face, and a side wall that encloses a space between the first face and the second face, the side wall including a first portion that includes metal, a printed circuit board that forms a face, which is substantially parallel to the first face, within the external housing, and includes a first region that includes a ground, and a second region that includes an insulating material, a switching element that includes a first terminal, a second terminal, and a third terminal, a communication module that is included within the external housing; a first electric path that interconnects the communication module and the first position of the first portion, a second electric path that is connected to the first terminal of the switching element, and is connected to the first electric path in the second region, a third electric path that is connected to the second terminal of the switching element and the first point of the ground, and a fourth electric path that is connected to the third terminal of the switching element and the second point of the ground.

The ground includes a portion that encloses at least a portion of the second region, and the first point and the second point are arranged to be spaced apart from each other in the portion that encloses at least a portion of the second region.

The switching element further includes a fourth terminal, and the electronic device includes a fifth electric path that is connected to the fourth terminal of the switching element and the third point of the ground.

The ground includes a portion that encloses at least a portion of the second region, and the first point, the second point, and the third point are arranged to be spaced apart from each other in the portion that encloses at least a portion of the second region.

A portable electronic device further includes a fifth electric path that directly interconnects the third point of the ground and the second electric path.

A portable electronic device further includes a fifth electric path that interconnects the third point and the fourth point of the ground. The fifth electric path crosses a portion of the second region, and includes at least one of a switching element and a passive element.

Embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

While the present disclosure has been shown and described with reference to certain embodiments thereof, it will be understood by those skilled in the art that various changes in form and details may be made therein without departing from the spirit and scope of the disclosure as defined by the following claims and their equivalents.

What is claimed is:

1. An antenna device comprising:
   a power feeding unit;
   a ground unit;
   a radiating unit that is electrically connected to the power feeding unit;
   a feeding line connecting the power feeding unit to the radiating unit;
   a junction provided on the feeding line, and positioned between the power feeding unit and the radiating unit; and
   a switching element comprising a first terminal and a plurality of second terminals,
   wherein the switching element is configured to select one or more points from a plurality of different points on the ground unit and connect the junction to the selected one or more points,
   wherein the junction connects the radiating unit to the feeding line and connects the radiating unit to the switching element,
   wherein the switching element is configured to connect the radiating unit to the ground unit by connecting the first terminal to any one second terminal of the plurality of second terminals, and
   wherein the radiating unit is a conductive region of a case of an electronic device housing the antenna device.

2. The antenna device of claim 1, wherein the first terminal is connected to the junction between the power feeding unit and the radiating unit.

3. The antenna device of claim 2, wherein the plurality of second terminals are arranged to correspond to the different points on the ground unit, respectively.

4. The antenna device of claim 3, wherein an electric length of the radiating unit is set depending on a position of the second terminal that is connected to the first terminal.

5. The antenna device of claim 2, wherein the ground unit includes a first ground portion that extends in one direction, a second ground portion that extends from the first ground portion, and a third ground portion that extends from the second ground portion and is arranged to be adjacent to the first ground portion.

6. The antenna device of claim 5, wherein an electric length of the radiating unit is set depending on a position of the second terminal that is connected to the first terminal.

7. The antenna device of claim 5, wherein the plurality of different points on the ground unit are arranged around the switching element.

8. The antenna device of claim 5, further comprising:
   a circuit board that includes a conductive region that is provided with the ground unit, and a non-conductive region that is formed among the first, second and third ground portions.

9. The antenna device of claim 1, further comprising:
   a circuit board that includes a non-conductive region and a conductive region,
   wherein the conductive region includes a ground unit that encloses at least a portion of the non-conductive region.

10. The antenna device of claim 9, wherein the plurality of different points of the ground unit are positioned at a location where the non-conductive region and the conductive region are in contact with each other.

11. An electronic device comprising:
    a case;
    a processor; and
    an antenna device including:
    a power feeding unit,
    a ground unit,
    a radiating unit formed as a conductive part of the case and electrically connected to the power feeding unit,
    a feeding line connecting the power feeding unit to the radiating unit;
    a junction provided on the feeding line, and positioned between the power feeding unit and the radiating unit, and
    a switching element comprising a first terminal and a plurality of second terminals,
    wherein the switching element is configured to select one or more points from a plurality of different points on the ground unit and connect the junction to the selected one or more points of the ground unit, and is further configured to connect the radiating unit to the ground unit by connecting the first terminal to any one second terminal of the plurality of second terminals, wherein the junction connects the radiating unit to the feeding line and connects the radiating unit to the switching element, and wherein the processor adjusts a resonance frequency of the antenna device by operating the switching element.

12. The electronic device of claim 11, wherein the first terminal is connected to the junction between the power feeding unit and the radiating unit.

13. The electronic device of claim 12, wherein the ground unit includes a first ground portion that extends in one direction, a second ground portion that extends from the first ground portion, and a third ground portion that extends from the second ground portion parallel to the first ground portion, and wherein the plurality of second terminals are arranged to correspond to the different points on the ground unit, respectively, and the first terminal is selectively connected to one of the second terminals.

14. The electronic device of claim 13, further comprising:
a circuit board that includes a conductive region that is provided with the ground unit, and a non-conductive region that is formed among the first, second and third ground portions.

15. The electronic device of claim 11, further comprising:
a circuit board that includes a non-conductive region and a conductive region, wherein the conductive region includes a ground unit that encloses at least a portion of the non-conductive region.

16. The electronic device of claim 15, wherein the plurality of different points on the ground unit are positioned at a location where the non-conductive region and the conductive region are in contact with each other.

17. The electronic device of claim 11, wherein the plurality of different points on the ground unit are arranged around the switching element.

18. An antenna device comprising:
a power feeding unit;
a ground unit provided on a circuit board;
a radiating unit that is electrically connected to the power feeding unit;
a feeding line connecting the power feeding unit to the radiating unit;
a junction provided on the feeding line, and positioned between the power feeding unit and the radiating unit; and
a switching element that selects one or more points from a plurality of different points on the ground unit and connects the junction to the selected one or more points on the ground unit, and wherein the junction connects the radiating unit to the feeding line and connects the radiating unit to the switching element, wherein the ground unit includes a first ground portion that extends in one direction, a second ground portion that extends from the first ground portion, and a third ground portion that extends from the second ground portion and is arranged to be adjacent to the first ground portion in a square or rectangular C shape, wherein a first and a second point among the plurality of different points are positioned on the first ground portion, and a third point among the plurality of different points is positioned on the third ground portion of the ground unit, respectively, and wherein the radiating unit is a conductive region of a case of an electronic device housing the antenna device.

* * * * *